(12) United States Patent
Ohta et al.

(10) Patent No.: US 8,002,260 B2
(45) Date of Patent: Aug. 23, 2011

(54) CARD PROCESSING UNIT

(75) Inventors: Keiji Ohta, Nagano (JP); Toshio Tatai, Nagano (JP); Shigeki Oguchi, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 12/559,765

(22) Filed: Sep. 15, 2009

(65) Prior Publication Data

US 2010/0001459 A1 Jan. 7, 2010

Related U.S. Application Data

(62) Division of application No. 11/494,404, filed on Jul. 27, 2006, now Pat. No. 7,635,122.

(30) Foreign Application Priority Data

Jul. 29, 2005 (JP) ................................. 2005-221712

(51) Int. Cl.
*B65H 3/44* (2006.01)
(52) U.S. Cl. ........................ 271/9.01; 271/9.13; 271/145
(58) Field of Classification Search .................. 271/145, 271/147, 9.01, 9.13
See application file for complete search history.

(56) References Cited

U.S. PATENT DOCUMENTS

| 5,193,794 A | 3/1993 | Steinhilber |
| 5,423,619 A * | 6/1995 | Kohno ........................... 400/525 |
| 6,957,746 B2 | 10/2005 | Martin et al. |
| 2004/0155105 A1 | 8/2004 | Nomiyama et al. |

FOREIGN PATENT DOCUMENTS

JP 2000-82116 A 3/2000

\* cited by examiner

*Primary Examiner* — Stefanos Karmis
*Assistant Examiner* — Howard Sanders
(74) *Attorney, Agent, or Firm* — Cantor Colburn LLP

(57) ABSTRACT

A card processing unit may include a card processing part for performing predetermined processing to a card, a card stack part in which a plurality of cards are stacked and stored, and a card feeding part for carrying a card between the card processing part and the card stack part. The card stack part may be structured such that the card stack part is capable of being separated from the card feeding part as a module and mounted on a main body base as a module. A plurality of card stack parts and a plurality of card processing parts may be mounted on the main body base as modules.

10 Claims, 19 Drawing Sheets

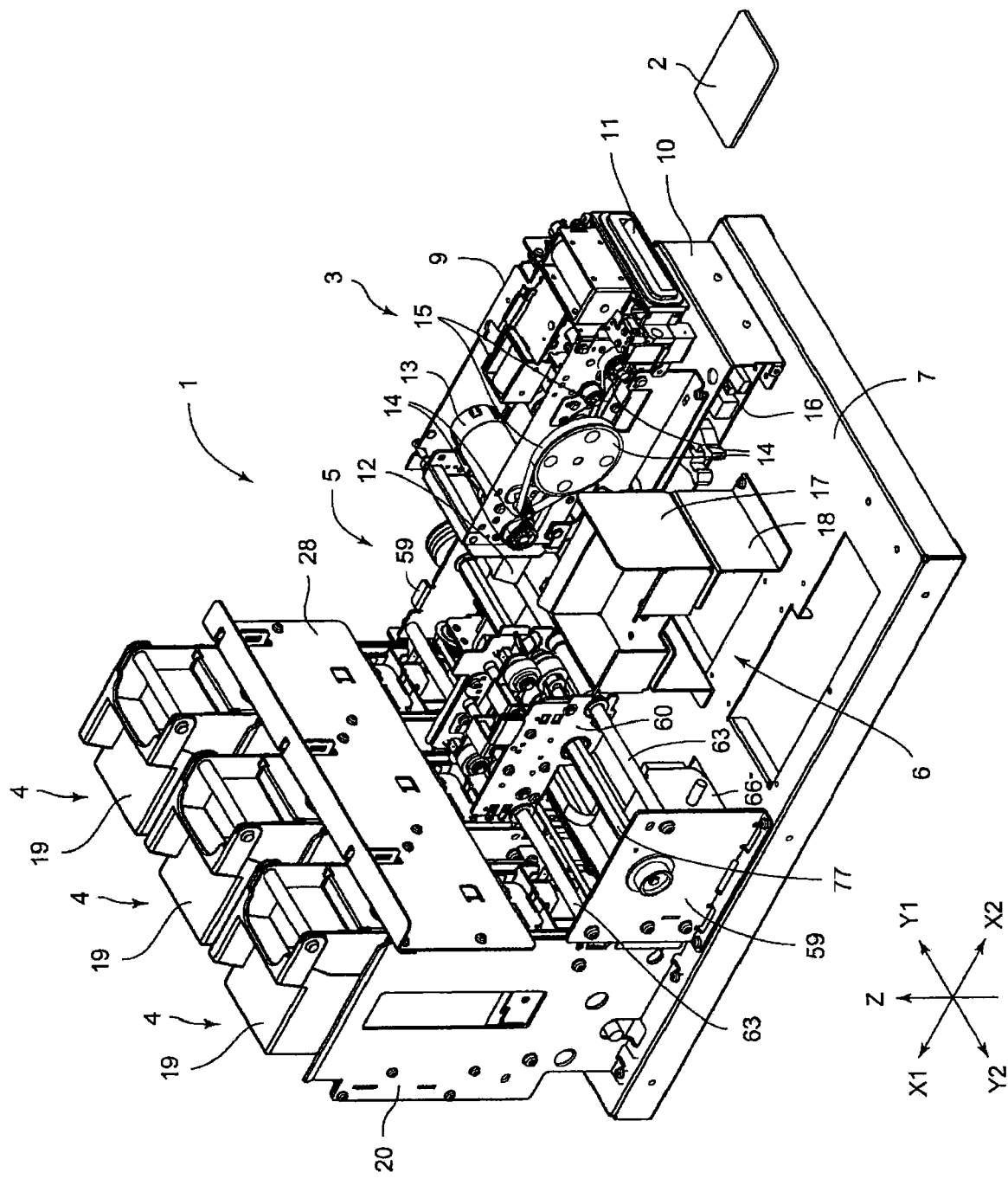
[Fig. 1]

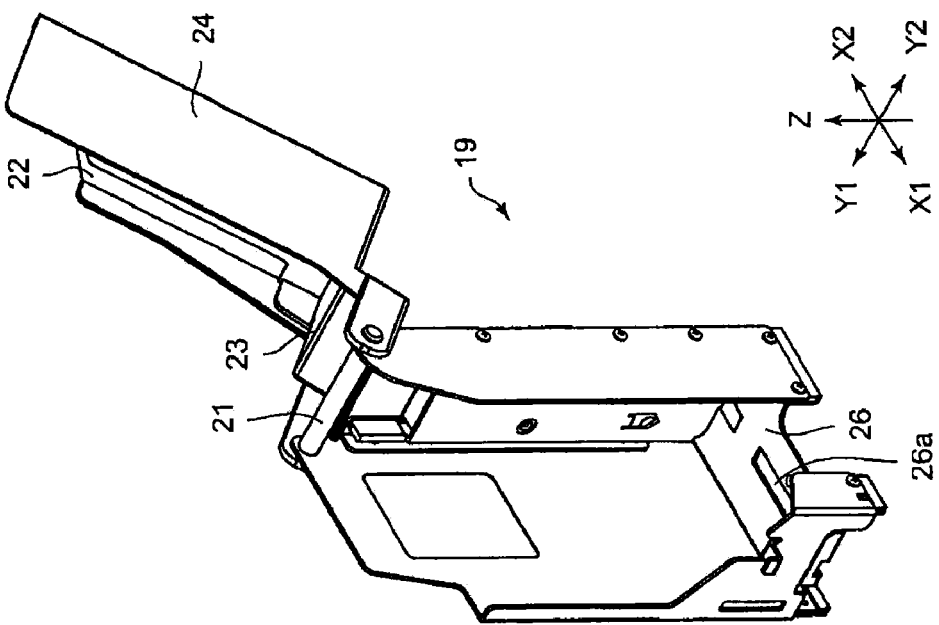
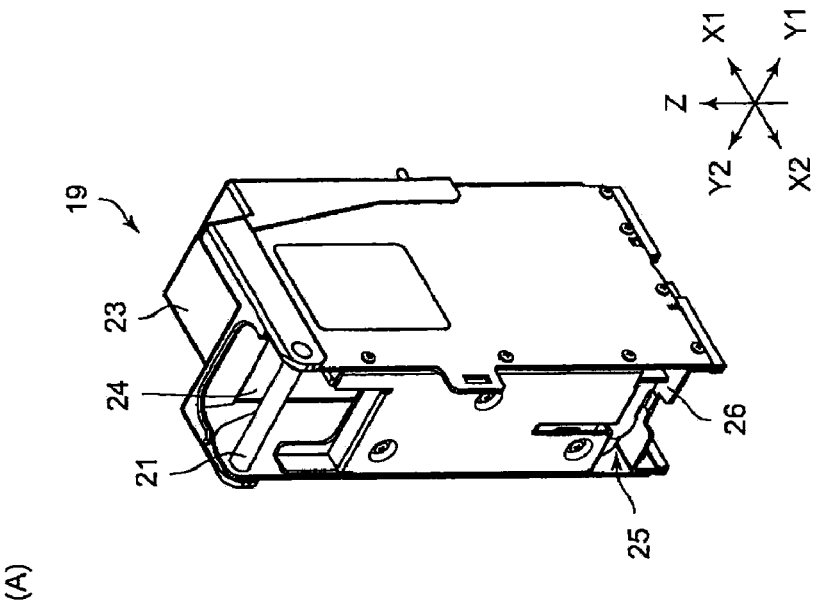
[Fig. 2]

[Fig. 3]
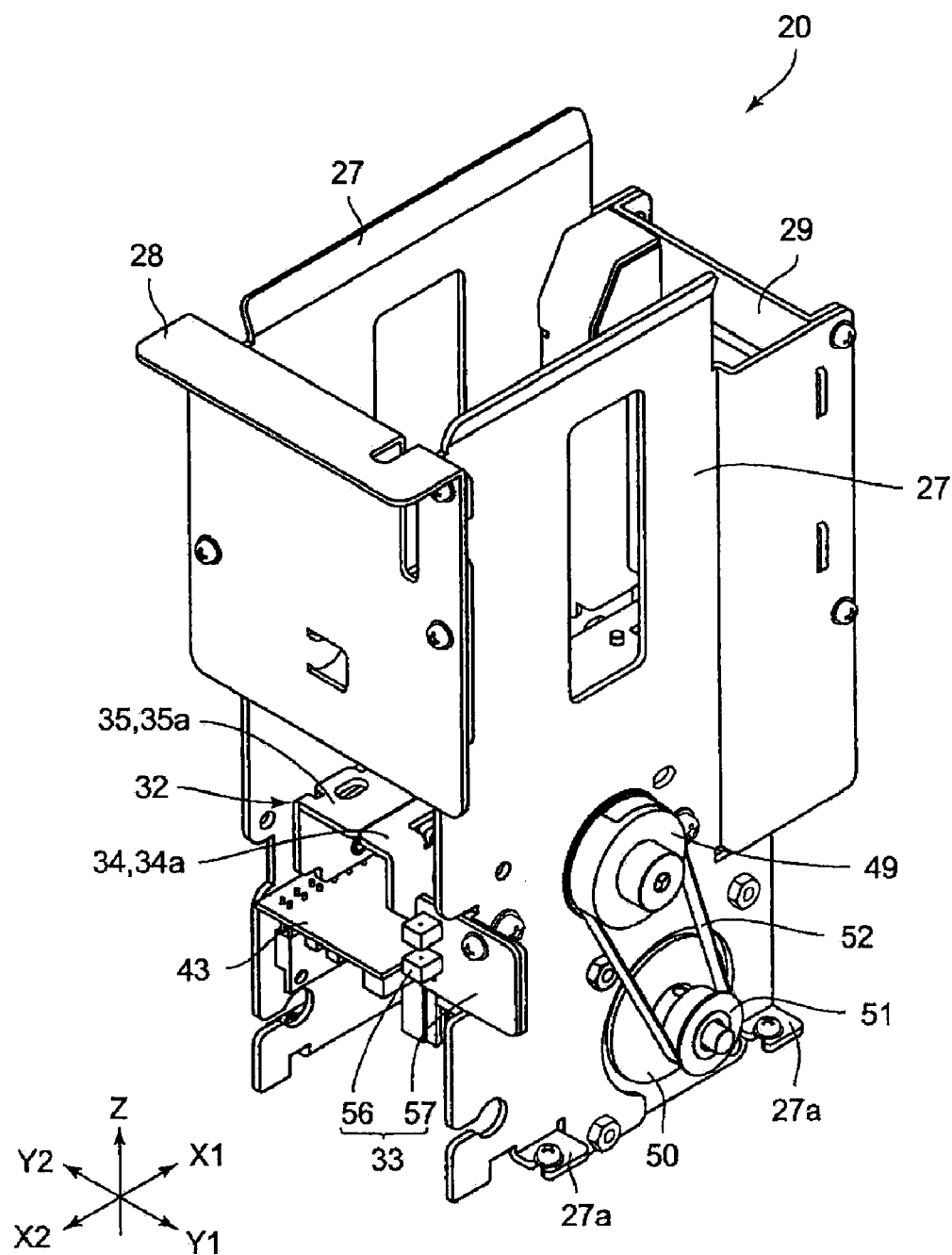

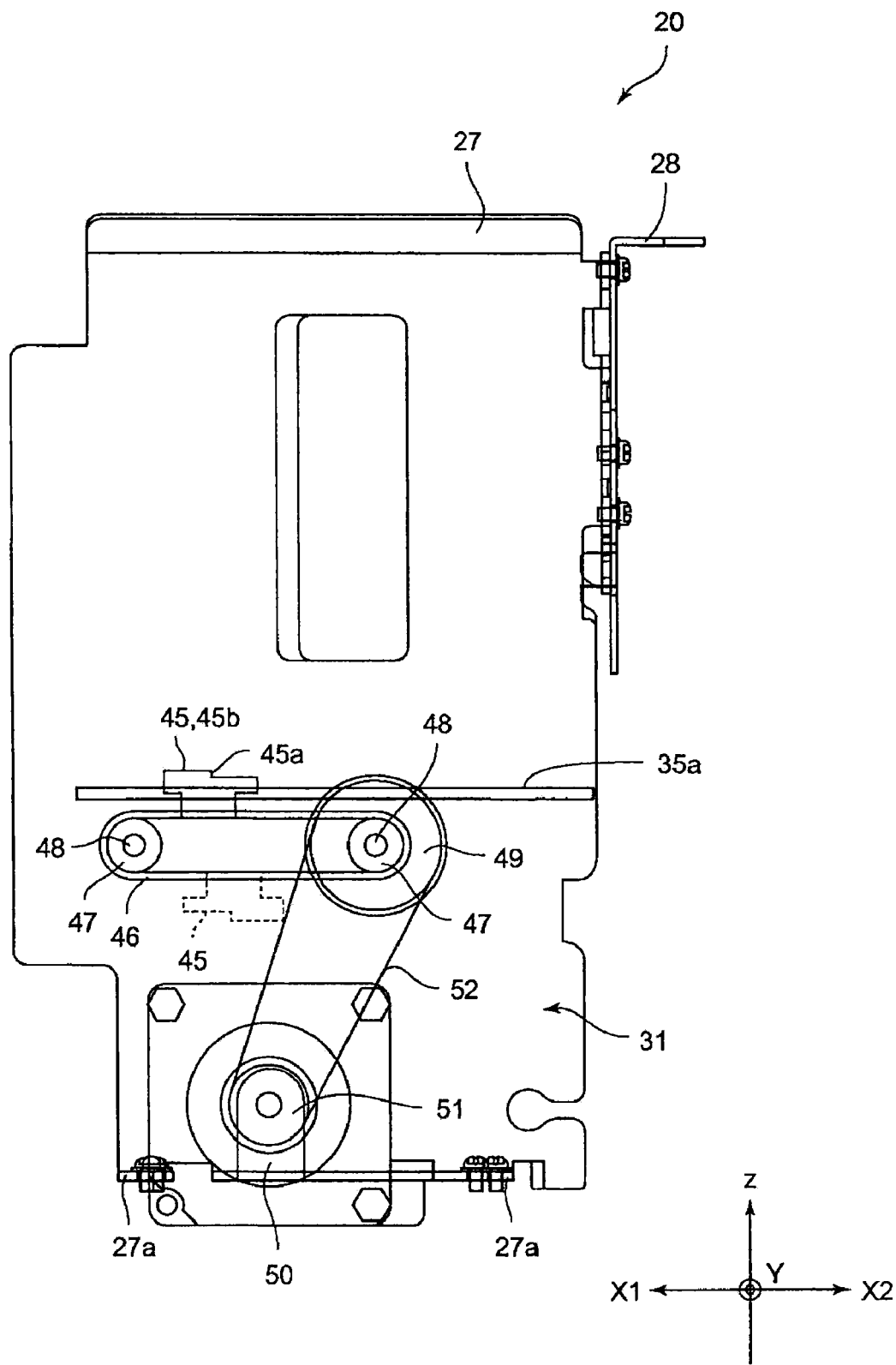
[Fig. 4]

[Fig. 5]
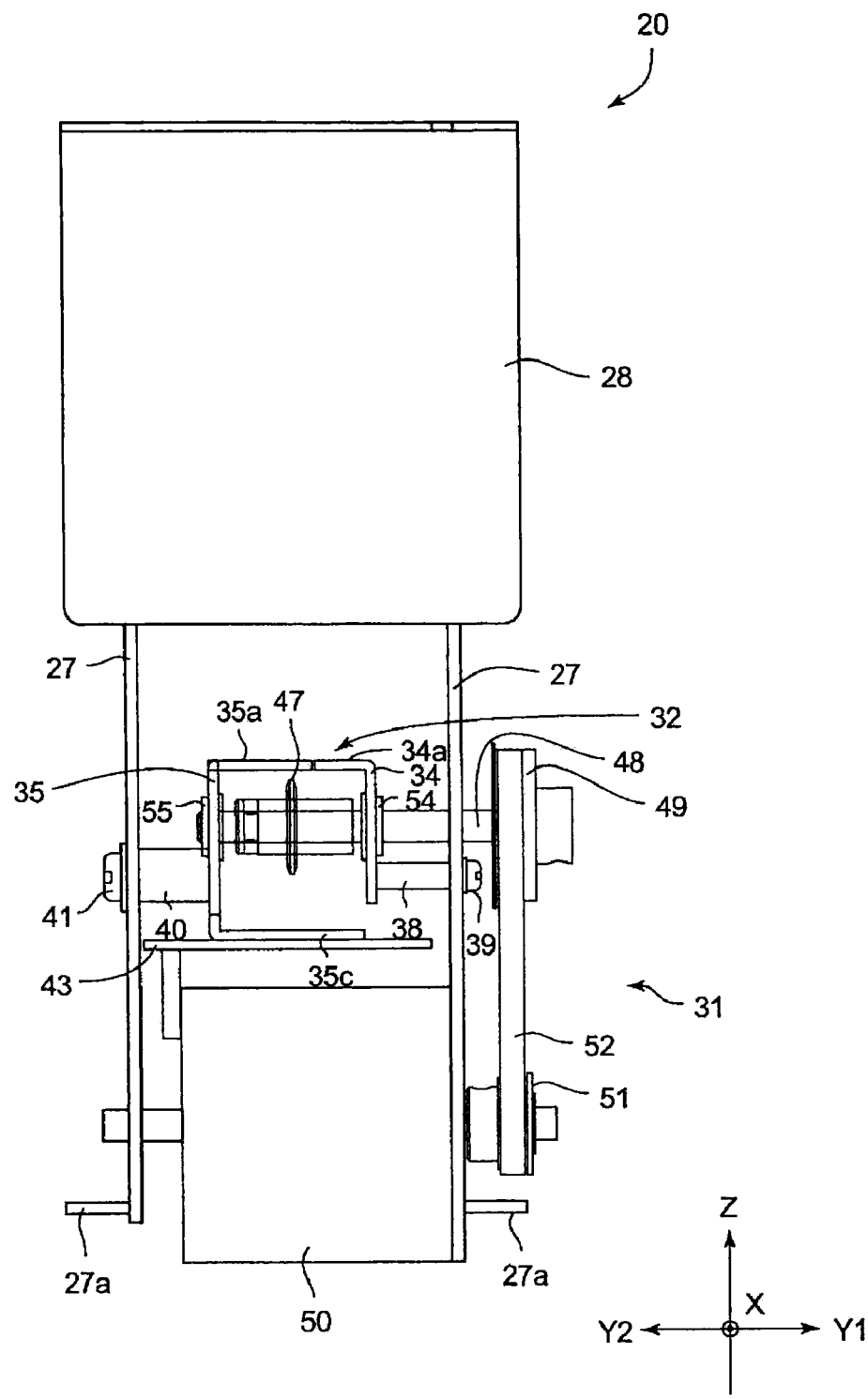

[Fig. 6]
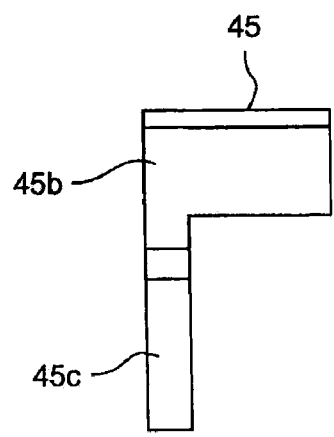
(A)
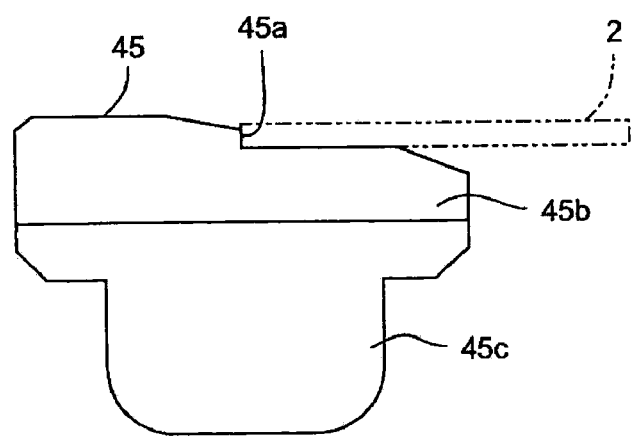
(B)
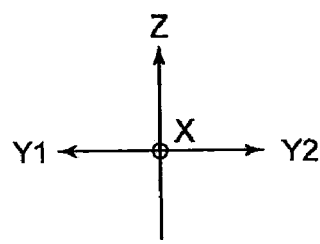
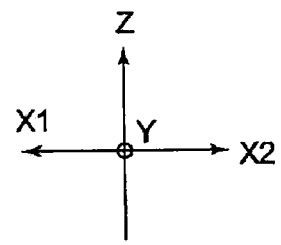

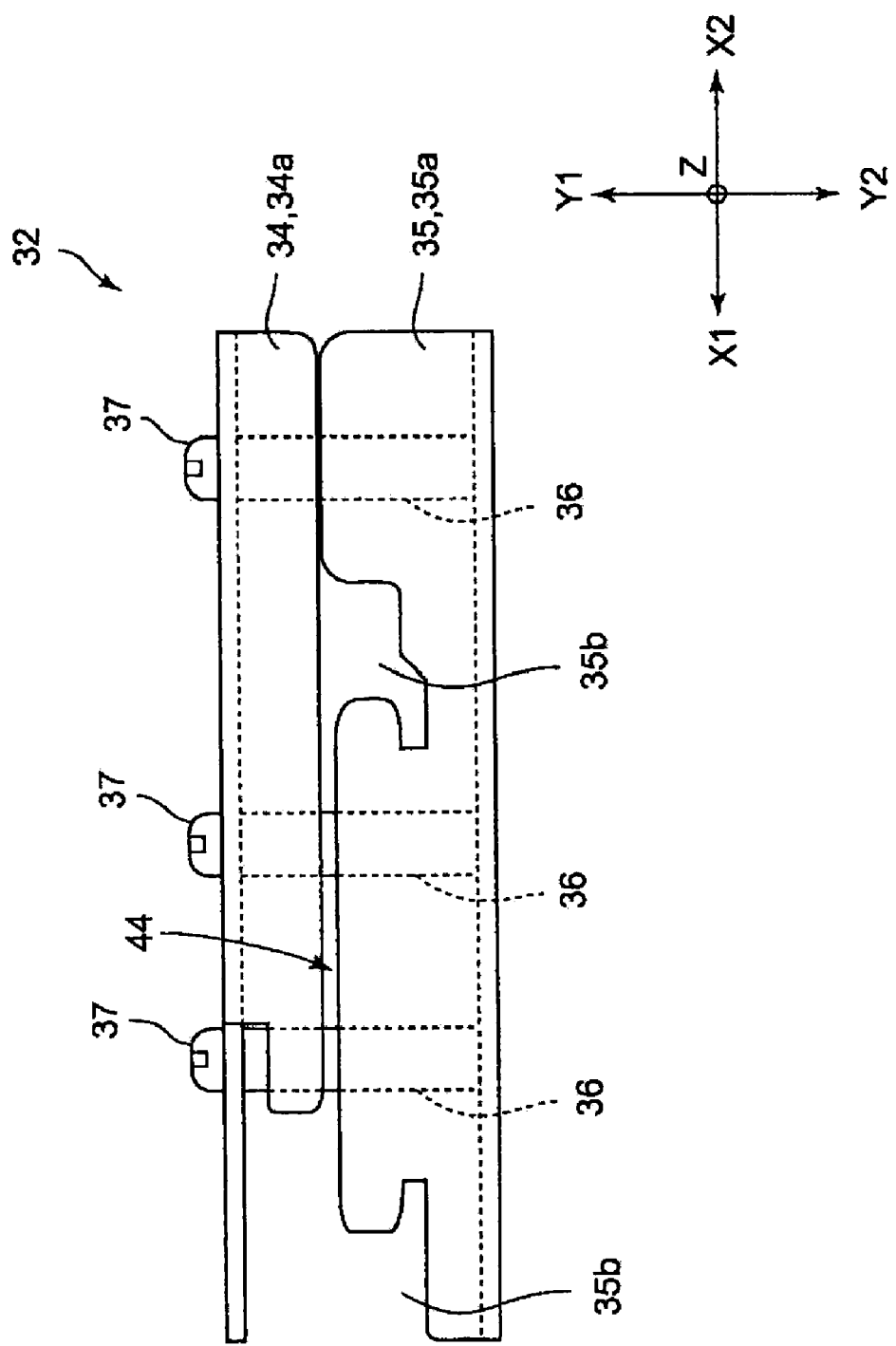

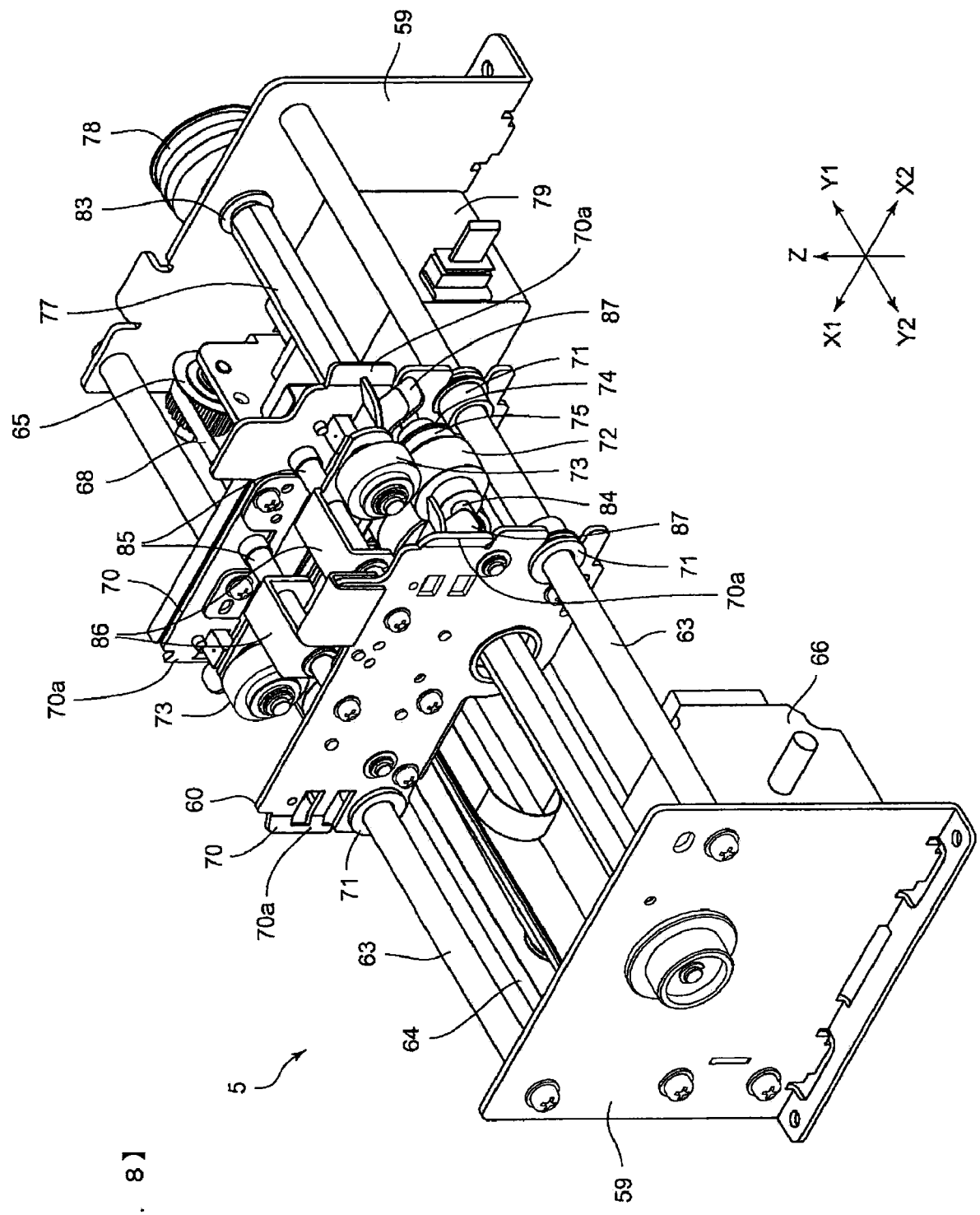
[Fig. 8]

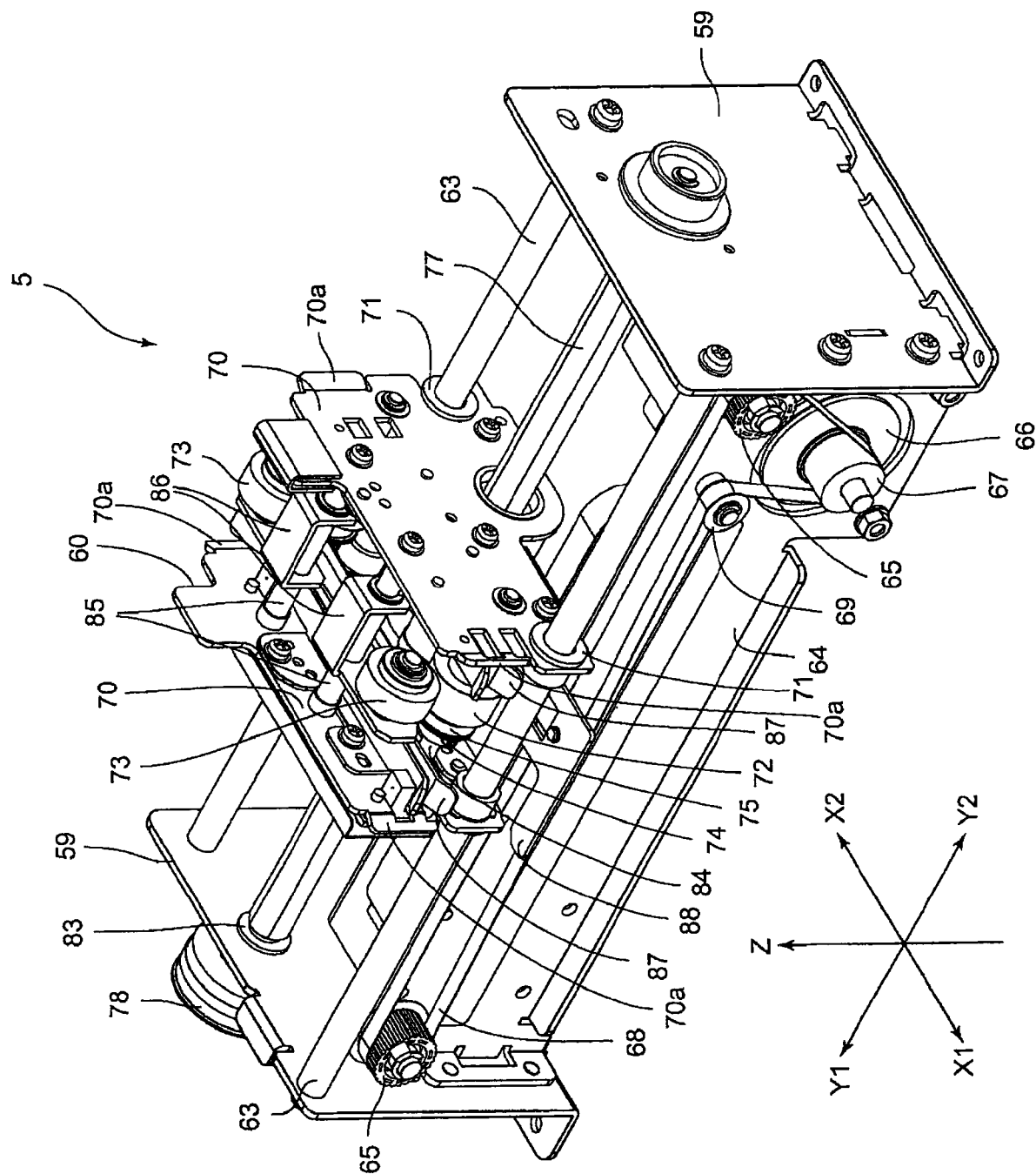
[Fig. 9]

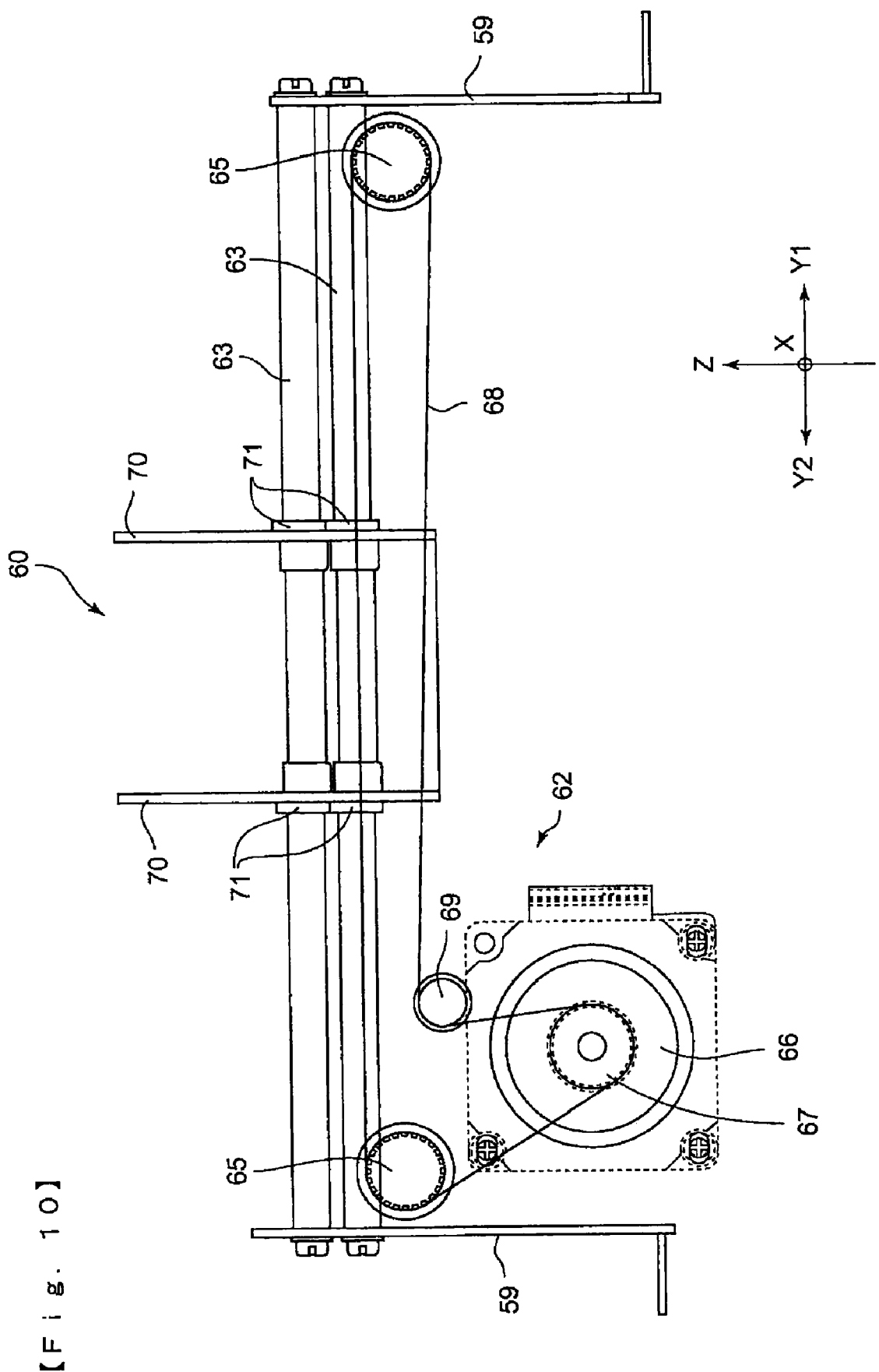

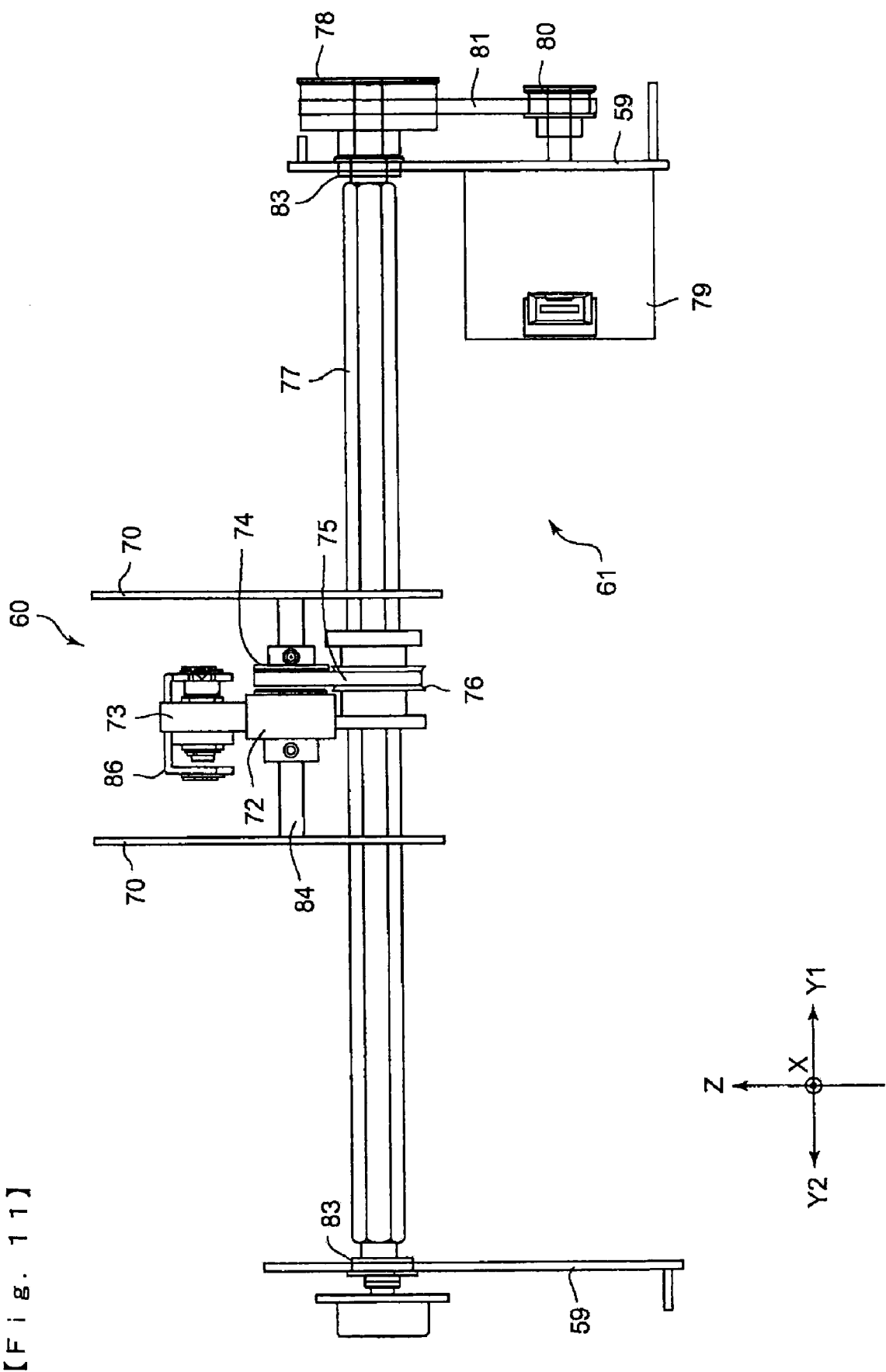
[Fig. 11]

[Fig. 12]
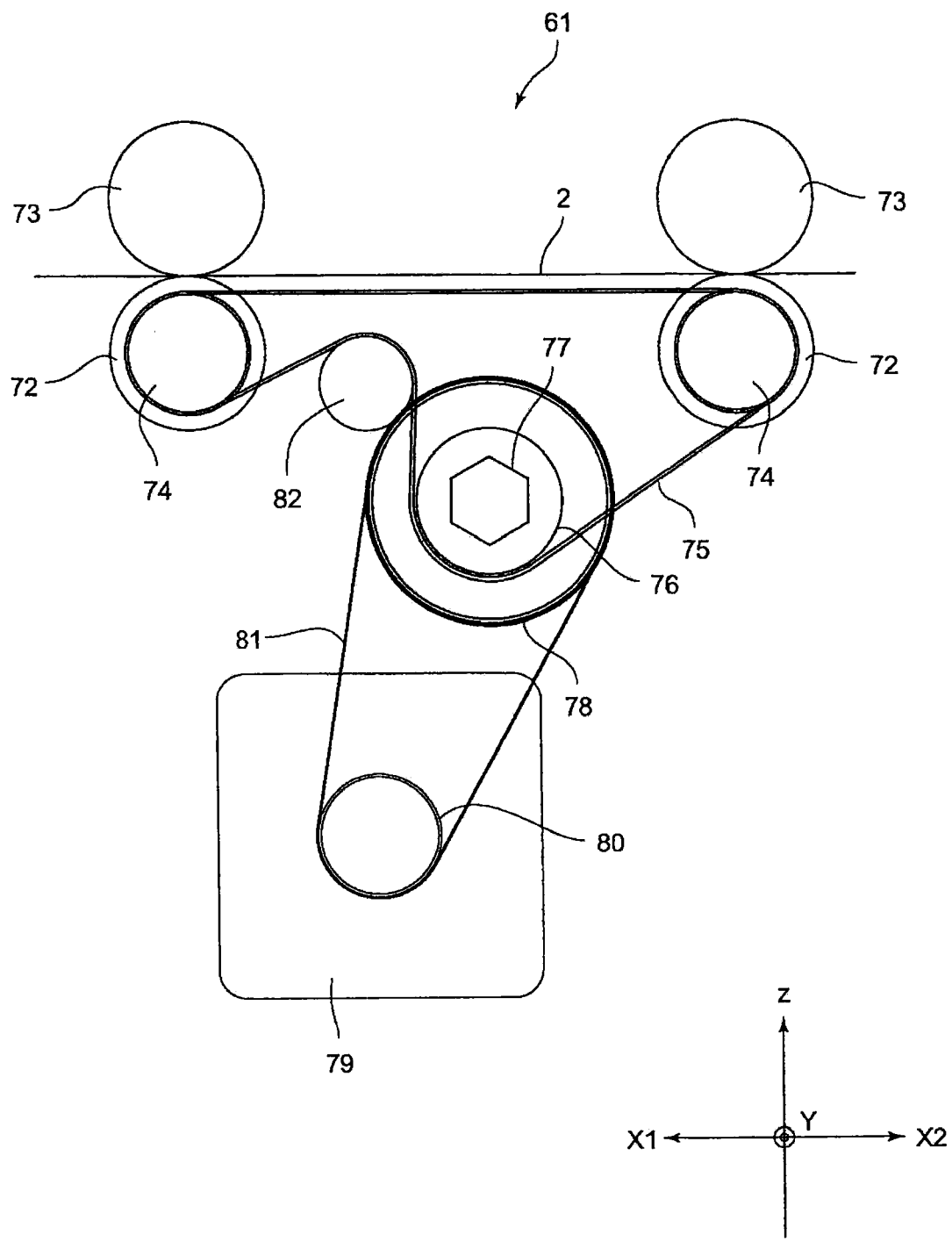

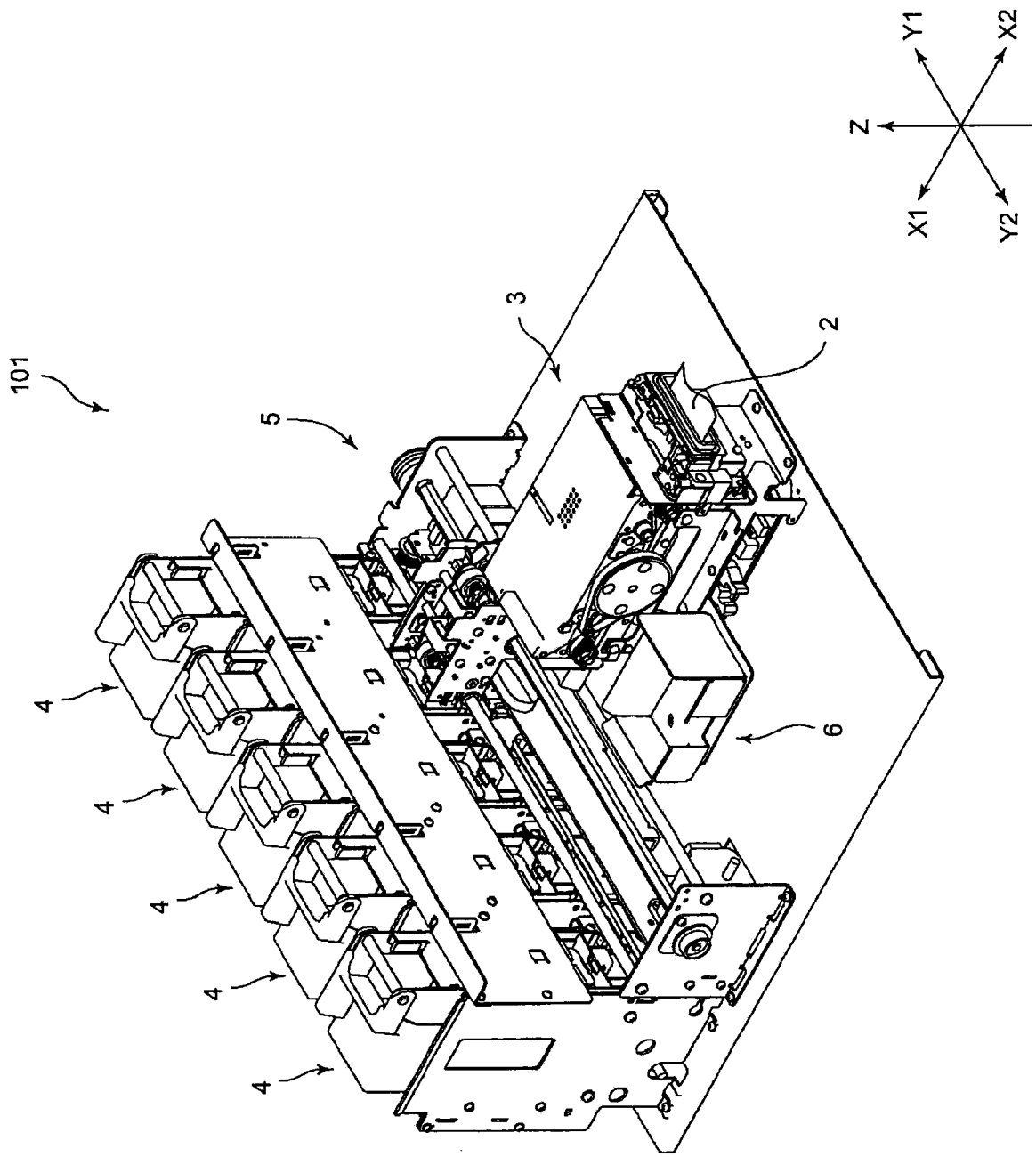
[Fig. 13]

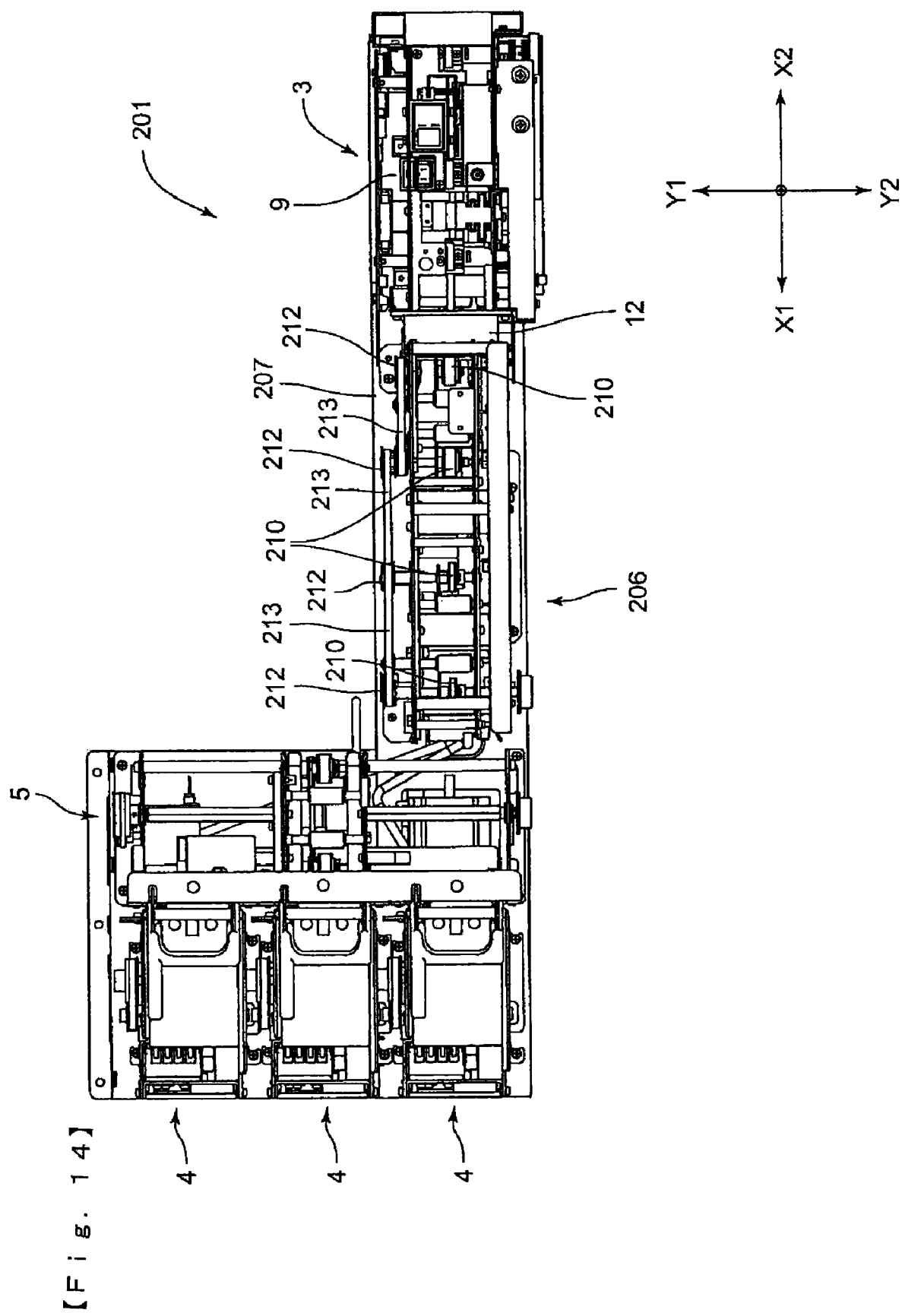

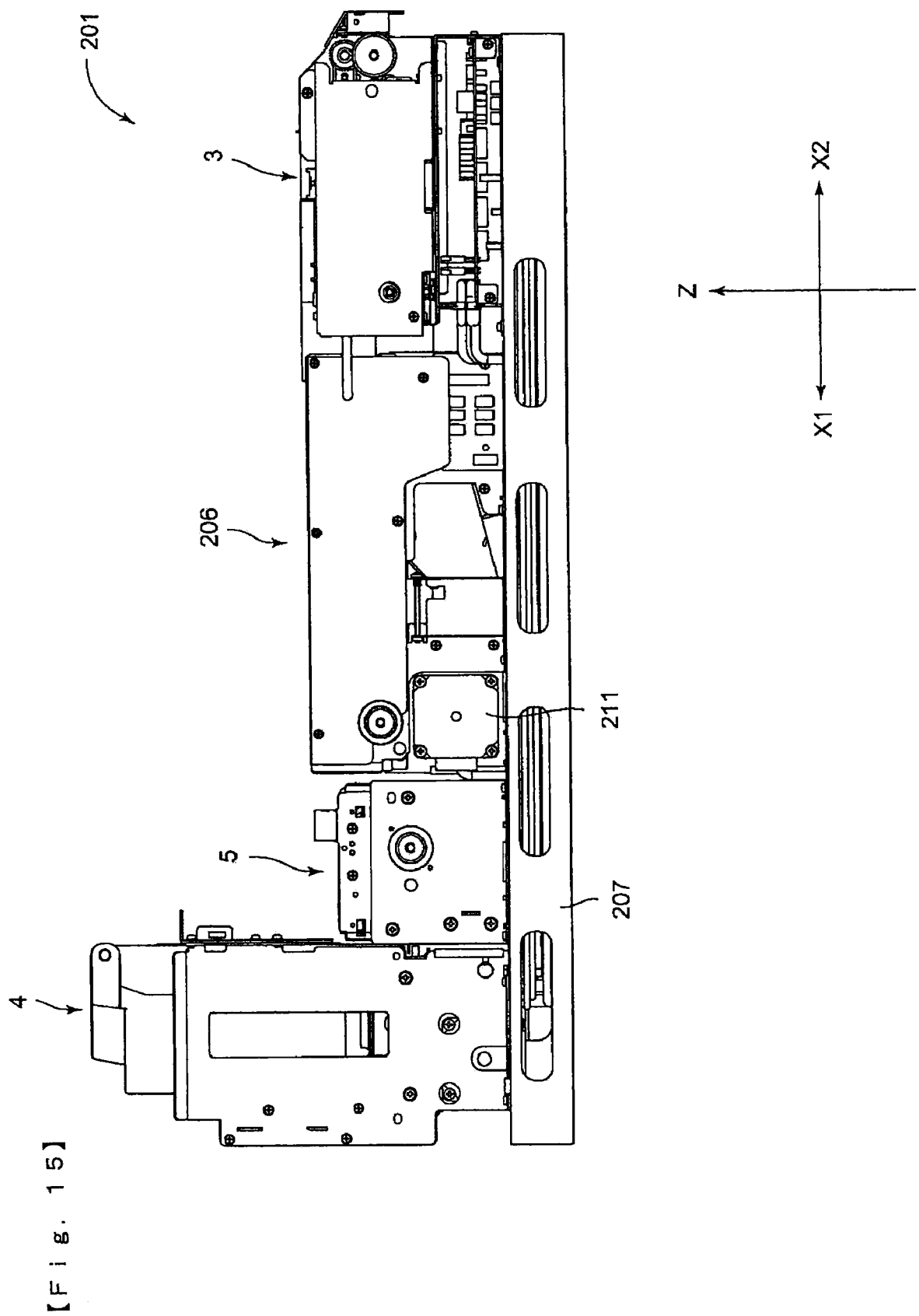
[Fig. 15]

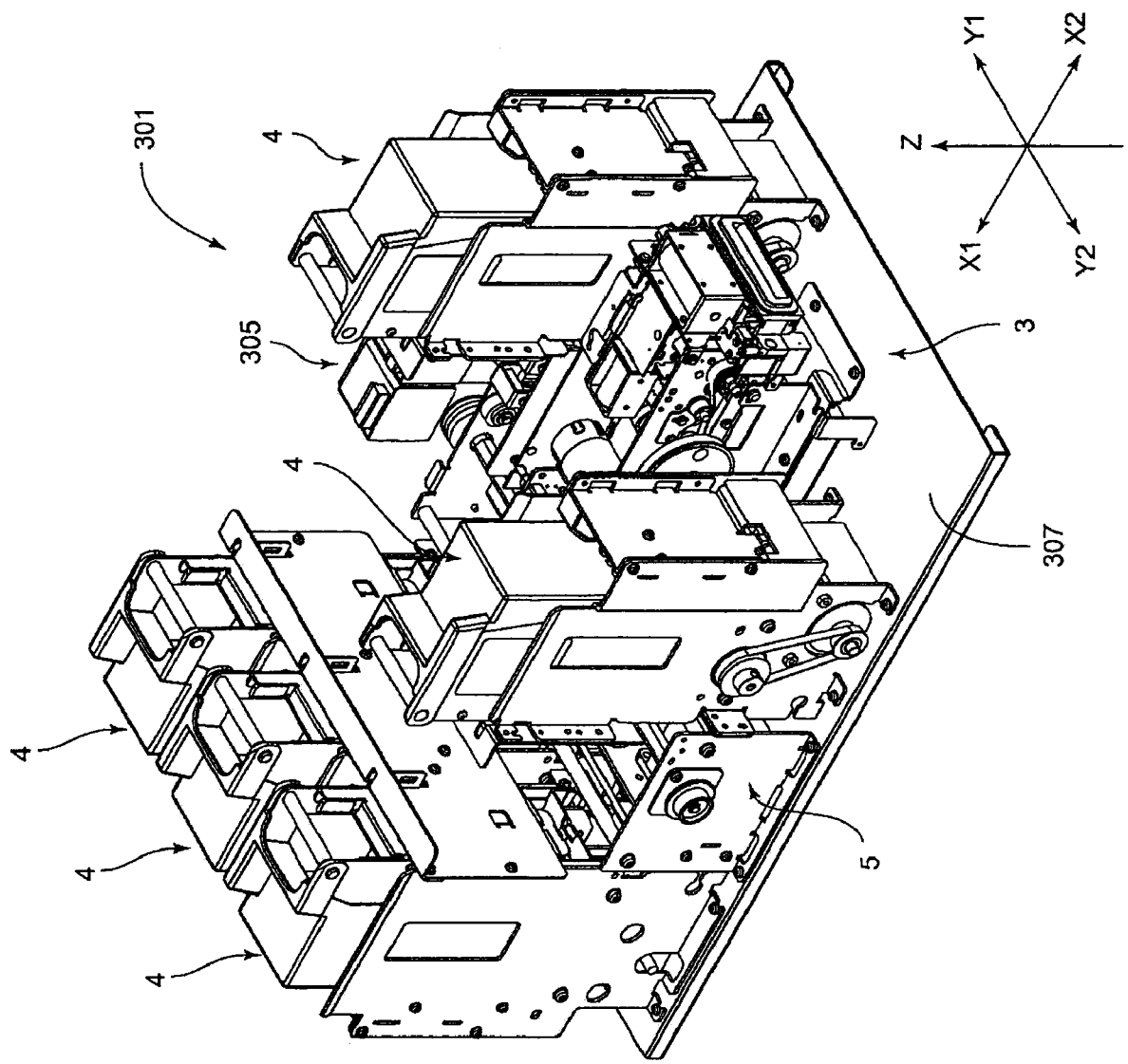

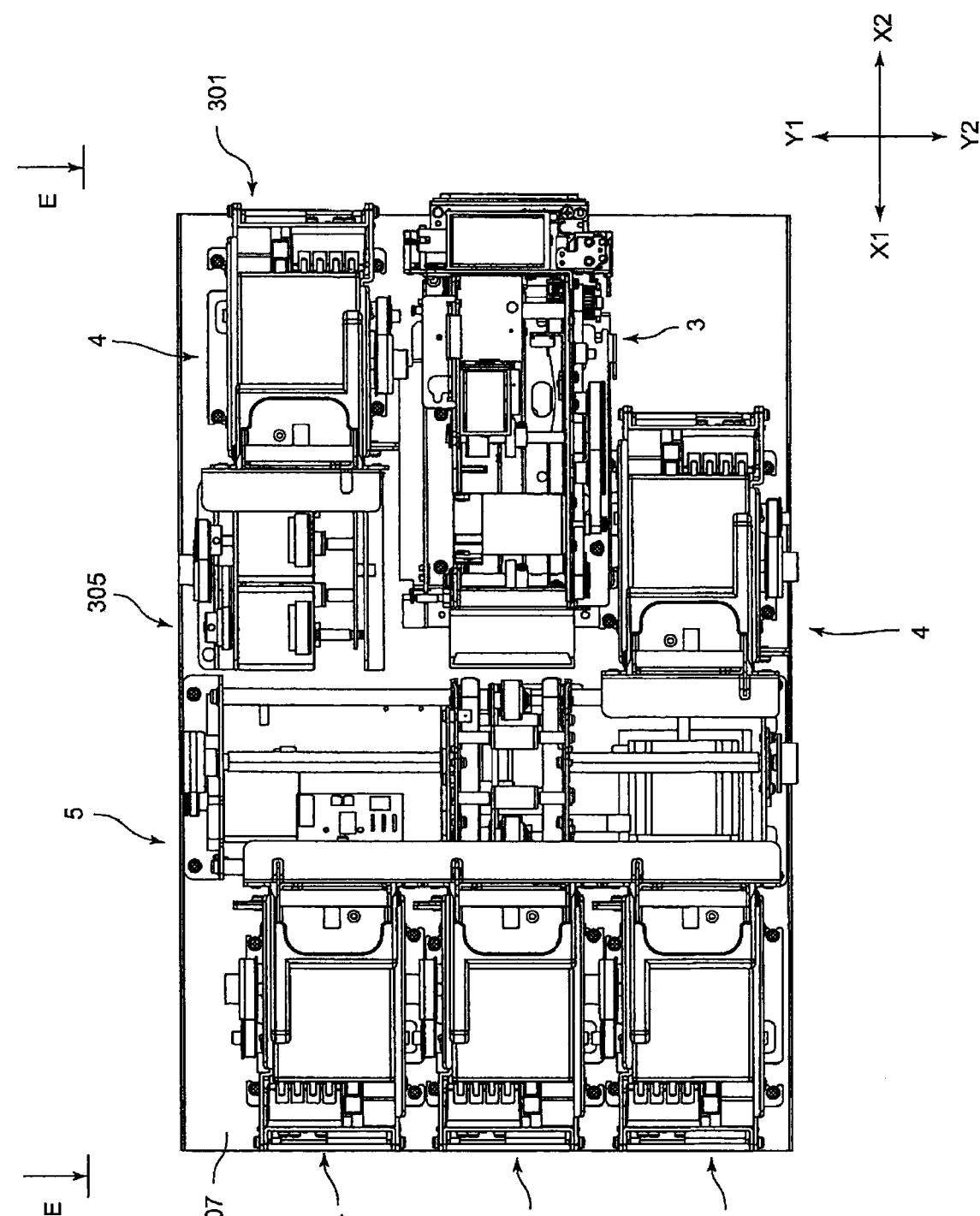

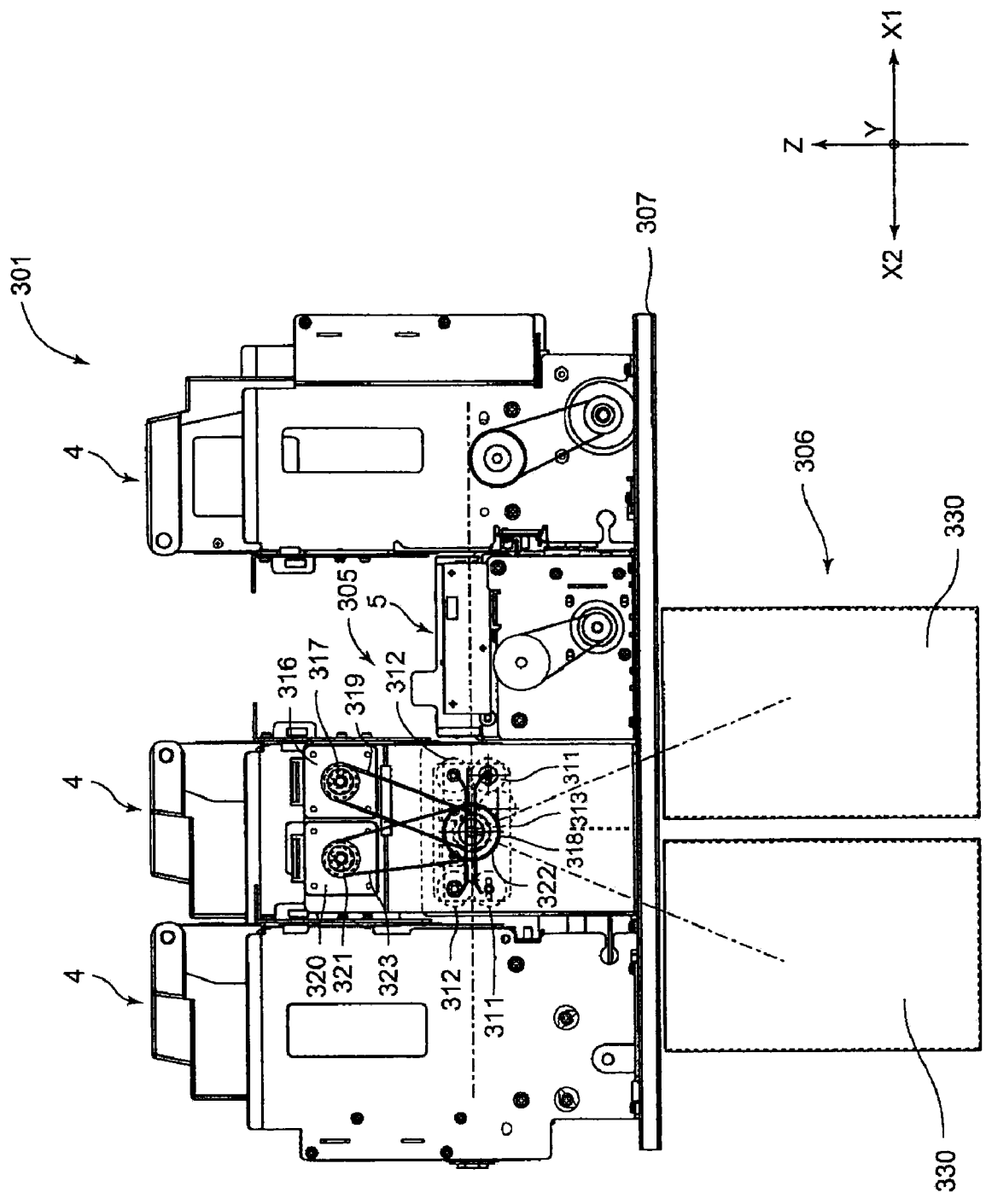
[Fig. 18]

[Fig. 19]
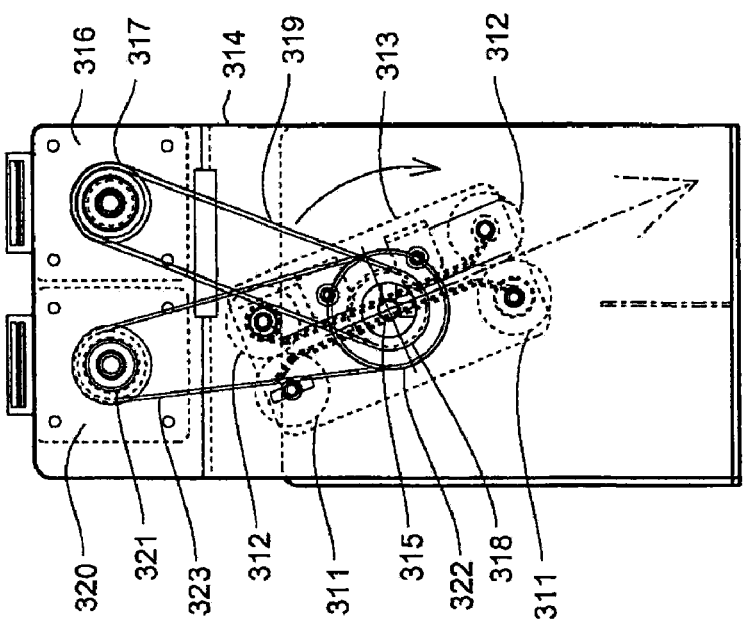
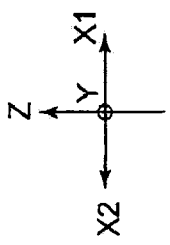
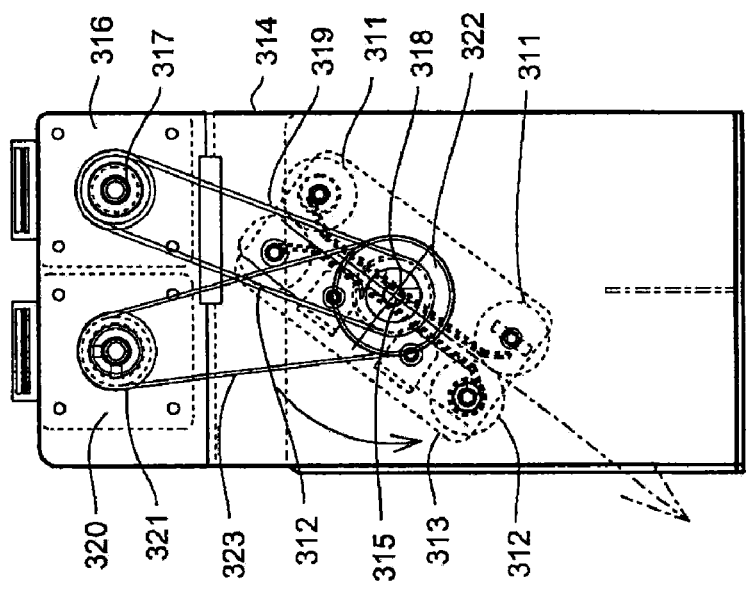
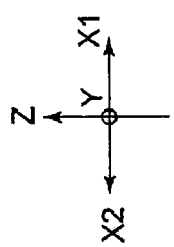

CARD PROCESSING UNIT

CROSS REFERENCE TO RELATED APPLICATION

The present application is a divisional application of U.S. patent application Ser. No. 11/494,404, filed on Jul. 27, 2006, the entire contents of which are incorporated herein by reference. The Ser. No. 11/494,404 application claimed the benefit of the date of the earlier filed Japanese Patent Application No. JP2005-221712 filed Jul. 29, 2005, which is also claimed herein.

FIELD OF THE INVENTION

An embodiment of present invention may relate to a card processing unit for performing processing to a card.

BACKGROUND OF THE INVENTION

A card processing unit which performs predetermined processing to a card such as a magnetic card provided with a magnetic stripe or an IC card provided with IC contacts has been conventionally used in a financial terminal equipment or the like. As such card processing units, a card issuing unit has been known which includes a card reader part for performing recording and reproducing magnetic information into and from a card, a plurality of card stack parts where a plurality of stacked cards is stored, and a card taking and moving part for taking out a card from the card stack part and carrying the card to issue the card which is selected out of plural types of cards by a user (see, for example, Japanese Patent Laid-Open No. 2000-82116).

In the card issuing unit described in the above-mentioned reference, a plurality of the card stack parts and the card taking and moving part are integrally assembled in a sub-frame. Further, a plurality of the card stack parts and the card taking and moving part which are assembled in the sub-frame, and a card reader part are mounted on a main body base of the card issuing unit.

Further, in this card issuing unit in the above-mentioned reference, a carriage is moved to a position of a card stack part which is selected out of a plurality of card stack parts that are adjacently disposed in a row for taking out a card from the card stack part. The card taken out from the card stack part is carried to the card reader part by the carriage to be issued from the card reader part to the outside.

In recent years, many sorts of financial terminal equipment in which a card issuing unit is utilized have been proposed. Therefore, a card issuing unit, which meets specifications of many sorts of financial terminal equipment and the like, and a card issuing unit having an outside shape, which is possible to fit many sorts of financial terminal equipment and the like, have been required in the market.

However, in the card issuing unit described in the above-mentioned reference, a plurality of card stack parts and the card taking and moving part are integrally assembled in the sub-frame. Therefore, when the number of the card stack parts is increased or decreased, or when the arrangement of the card stack parts to the card taking and moving part is modified, it may be required to modify the structure of the sub-frame. As a result, in the card issuing unit described in the above-mentioned reference, when the layout is to be modified, the entire unit is required to be redesigned and thus designing time is required once again and design cost also increases.

SUMMARY OF THE INVENTION

In view of the problems described above, an embodiment of the present invention may advantageously provide a card processing unit which is capable of easily modifying its layout.

Thus, according to an embodiment of the present invention, there may be provided a card processing unit including a card processing part for performing a predetermined processing to a card, at least a card stack part in which a plurality of cards are stacked and stored, and a card feeding part for carrying a card between the card processing part and the card stack part. Further, the card stack part is structured as a module such that the card stack part is capable of being separated from the card feeding part.

In a card processing unit in accordance with an embodiment of the present invention, the card stack part is structured as a module such that the card stack part is capable of being separated from the card feeding part. In other words, the card stack part is structured so as to be capable of being separated from the card feeding part as an independent functionally unified component. Therefore, the card stack part can be freely disposed to the card feeding part. As a result, according to the card processing unit in accordance with an embodiment, the layout can be easily modified.

Further, according to an embodiment of the present invention, there may be provided a card processing unit including a card processing part for performing a predetermined processing to a card, at least a card stack part in which a plurality of cards are stacked and stored, a card feeding part for carrying a card between the card processing part and the card stack part, and a main body base on which at least the card stack part and the card feeding part are mounted. Further, the card stack part is mounted on the main body base as a module.

In a card processing unit in accordance with an embodiment, at least a card stack part is mounted on a main body base as a module. In other words, the card stack part is mounted on the main body base as an independent functionally unified component. Therefore, arrangement of the card stack part on the main body base can be easily modified. As a result, according to the card processing unit in accordance with an embodiment, the layout can be easily modified.

Specifically, the card stack part preferably includes a card ejection mechanism for ejecting a card to the card feeding part. In addition, it is preferable that the card stack part includes a cassette which is capable of storing a number of cards and a cassette holder into which the cassette is accommodated, and that the card ejection mechanism includes a feeding mechanism for ejecting a card which is stored in the cassette to the card feeding part, a placing part on which the cassette is placed, and a detecting mechanism for detecting a position of the card feeding part, and the feeding mechanism, the placing part and the detecting mechanism is provided in the cassette holder. According to the structure described above, the card stack part can be mounted on the main body base as an independent functionally unified component.

In this case, it is preferable that the cassette holder is provided with a drive motor for driving the feeding mechanism which is mounted on the under side of the placing part of the cassette holder, and a feeding pawl for carrying a card which is stored in the cassette to the card feeding part and that the feeding pawl is moved by the drive motor. Further, it is preferable that the cassette holder is provided with a control board which is connected to a main control board of the card issuing unit through a connector, and that the card stack part is structured to perform one independent unified function as a module by means of that the control board gives and receives signals to and from the main control board.

In accordance with an embodiment, the card stack part preferably includes a card ejection mechanism for ejecting a card to the card feeding part. According to the structure described above, the card feeding part is not required to enter into the inside of the card stack part for taking out a card. Therefore, a high degree of relative positional accuracy between the card stack part and the card feeding part is not required. As a result, the modularization of the card stack part becomes easy. Further, the structure of the card feeding part is simplified and thus the modularization of the card feeding part is also easily attained. In this case, it is preferable that the card stack part is comprised of a plurality of card stack parts and the plurality of the card stack parts is disposed so as to be respectively adjacent to the card feeding part.

In accordance with an embodiment, the card feeding part includes two side plates, the carriage which is movably supported between the side plates in a direction that the plurality of the card stack parts are adjacently disposed, and a card feeding mechanism which moves the carriage in the direction that the plurality of the card stack parts are adjacently disposed, and the card feeding mechanism is provided with a motor for moving the carriage which is disposed between the side plates.

In accordance with an embodiment, the card feeding part is provided with a draw-in mechanism for drawing the card which is ejected by the card ejection mechanism from the card stack part. In this case, the draw-in mechanism includes at least a drive roller for drawing a card into the inside of the carriage or for feeding out a card from the inside of the carriage, at least a driven roller which is disposed to face the drive roller, and a drive motor for driving the drive roller. According to the structure as described above, the card feeding part can be mounted on the main body base as an independent functionally unified component. Further, the card feeding part may include a control board for driving and controlling the draw-in mechanism, and the card feeding part may be structured to perform one unified function as a module by means of that the control board gives and receives signals to and from the main control board.

Further, according to an embodiment of the present invention, there may be provided a card processing unit including a card processing part for performing a predetermined processing to a card, at least a card stack part in which a plurality of cards are stacked and stored, and a card feeding part for carrying a card between the card processing part and the card stack part. Further, the card stack part is provided with a card ejection mechanism for ejecting a card to the card feeding part.

In the card processing unit in accordance with an embodiment, the card stack part is provided with a card ejection mechanism for ejecting a card to the card feeding part. Therefore, the card feeding part is not required to enter into the inside of the card stack part to take out a card and thus a high degree of relative positional accuracy between the card stack part and the card feeding part is not required. Accordingly, the modularizations of the card stack part and the card feeding part is easily attained. As a result, arrangement of the card stack part or the card feeding part can be easily modified and layout of the card processing unit is easily modified.

In accordance with an embodiment, an ejecting direction of the card in the card stack part is perpendicular to a carrying direction of the card in the card feeding part. According to the structure described above, more card stack parts can be disposed each other in a state that they are adjacent to the card feeding part. Therefore, a large number of cards can be stored in the card stack parts or more types of cards can be stored in the card stack parts.

In accordance with an embodiment, the card stack part is disposed on one side of the card feeding part in a direction that is perpendicular to a carrying direction of the card in the card feeding part, and the card processing part is disposed on the other side of the card feeding part. According to the structure described above, the size of the card processing unit in the carrying direction of a card can be reduced.

In accordance with an embodiment, the card feeding part is provided with a draw-in mechanism for drawing the card which is ejected by the card ejection mechanism from the card stack part. According to the structure described above, a card can be surely drawn into the inside of the card feeding part and thus interference between a carried card and the card stack part can be surely prevented.

In accordance with an embodiment, the card feeding part includes a carriage for feeding a card on which at least a part of the draw-in mechanism is mounted, and the card stack part is provided with a detecting mechanism for detecting a position of the carriage. According to the structure described above, even when arrangement of the modularized card stack part is modified in various ways, alignment of the carriage, on which the draw-in mechanism is mounted, with the card stack part can be surely performed. Therefore, a card can be surely carried from the card stack part to the card feeding part.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1 is a perspective view showing a card processing unit in accordance with a first embodiment of the present invention.

FIG. 2(A) is a perspective view showing a cassette in FIG. 1 which is in a closed state and FIG. 2(B) is a perspective view showing the cassette which is in an opened state.

FIG. 3 is a perspective view showing a cassette holder which is viewed from the back side in FIG. 1.

FIG. 4 is an explanatory side view showing a feeding mechanism in a cassette holder shown in FIG. 3.

FIG. 5 is an explanatory front view showing the feeding mechanism in the cassette holder shown in FIG. 3.

FIG. 6(A) is a rear view showing a feeding pawl shown in FIG. 4 and FIG. 6(B) is its side view.

FIG. 7 is a plan view showing a placing part shown in FIG. 3.

FIG. 8 is a perspective view showing a card feeding part which is viewed from near side in FIG. 1.

FIG. 9 is a perspective view showing the card feeding part which is viewed from the back side in FIG. 1.

FIG. 10 is an explanatory front view showing a card feeding mechanism in the card feeding part shown in FIG. 8.

FIG. 11 is an explanatory front view showing a draw-in mechanism of the card feeding part shown in FIG. 8.

FIG. 12 is an explanatory side view showing a draw-in mechanism of the card feeding part shown in FIG. 8.

FIG. 13 is a perspective view showing a card issuing unit in accordance with a modified example of the first embodiment of the present invention.

FIG. 14 is a plan view showing a card issuing unit in accordance with a second embodiment of the present invention.

FIG. 15 is a side view showing the card issuing unit shown in FIG. 14.

FIG. 16 is a perspective view showing a card issuing unit in accordance with a third embodiment of the present invention.

FIG. 17 is a plan view showing the card issuing unit shown in FIG. 16.

FIG. 18 is a side view showing the card issuing unit which is viewed from the "E-E" direction in FIG. 17.

FIG. 19(A) is a view showing a card turning part shown in FIG. 17 in a state that a mounting member is inclined in one direction and FIG. 19(B) is a view in a state that the mounting member is inclined in the other direction.

DETAILED DESCRIPTION OF THE PREFERRED EMBODIMENTS

A card issuing unit in accordance with an embodiment of the present invention will be described below with reference to the accompanying drawings.

First Embodiment

FIG. 1 is a perspective view showing a card processing unit 1 in accordance with a first embodiment of the present invention.

The card processing unit 1 in accordance with the first embodiment is a card issuing unit for issuing a card 2 on which specified information is recorded. Therefore, the card processing unit 1 in accordance with the first embodiment is expressed as the card issuing unit 1. As shown in FIG. 1, the card issuing unit 1 includes a card reader part 3 where information is recorded in a card 2 and/or information recorded in the card 2 is reproduced, three card stack parts 4 in which cards 2 to be issued are stored, a card feeding part 5 for feeding the card 2 between the card reader part 3 and three card stack parts 4, and a card reject part 6 in which a disused card 2 (or a rejected card) is stored. These parts are respectively structured as a module and mounted on a substantially rectangular main body base 7. In other words, these parts are respectively mounted on the main body base 7 such that each of them is structured as a functionally unified portion.

In this specification, as shown in FIG. 1, a forward and backward direction in the card issuing unit 1 is set to be an "X" direction, a horizontal direction in the card issuing unit 1 is set to be a "Y" direction, and a height direction in the card issuing unit 1 is set to be a "Z" direction. Further, the back side in the card issuing unit 1 in FIG. 1 is set to be an "X1" direction and its near side is set to be an "X2" direction, its right side is set to be a "Y1" direction, and its left side is set to be an "Y2" direction. In addition, a plane formed by the "X" direction and the "Y" direction is set to be an "XY" plane, a plane formed by the "Y" direction and the "Z" direction is set to be a "YZ" plane, and a plane formed by the "Z" direction and the "X" direction is set to be a "ZX" plane.

As shown in FIG. 1, the card reader part 3 is mounted on an end side in the "X2" direction and on an end side in the "Y1" direction of the main body base 7. The card feeding part 5 is mounted on the main body base 7 on the "X1" direction side of the card reader part 3 so as to be adjacent to the card reader part 3. Three card stack parts 4 are mounted on the main body base 7 on the "X1" direction side of the card feeding part 5 so as to be adjacent to the card feeding part 5. The card reject part 6 is mounted on the main body base 7 on the "Y2" direction side of the card reader part 3 and on the "X2" direction side of the card feeding part 5.

The card 2 is, for example, a magnetic card whose surface is provided with a magnetic stripe, a contact type of IC card whose surface is provided with IC contacts, a non-contact type of IC card in which a communication antenna is embedded, or the like.

The card reader part 3 includes a card reader 9 for recording or reproducing information in or from the card 2 and a sub-base 10 on which the card reader 9 is mounted. In accordance with the first embodiment, the card reader part 3 is a card processing part for performing predetermined processing to the card 2.

The card reader 9 includes a magnetic head (not shown) for performing recording or reproducing information in or from the card 2. Further, based on a type of the card 2, the card reader 9 may be provided with a structure such as an antenna (not shown) for performing in communication with a non-contact type of IC card, IC contacts (not shown) or the like, instead of the magnetic head or in addition to the magnetic head. The card reader 9 is provided with a front side insert slot 11 at the end portion in the "X2" direction for taking the card 2 into the card issuing unit 1 and for performing ejection and issuing of the card 2 from the card issuing unit 1, and the card reader 9 is provided with a rear side insert slot 12 at the end portion in the "X1" direction for ejecting the card 2 to the card feeding part 5 or for taking the card 2 from the card feeding part 5.

The card reader 9 is provided with a feeding mechanism for feeding a card 2 in the "X" direction. The feeding mechanism is provided with feeding rollers (not shown) for carrying the card 2. The feeding rollers are rotationally driven by a drive motor 13, a plurality of pulleys 14, a belt 15 and the like to feed the card 2.

The sub-base 10 is formed of a metal plate such as a sheet steel. The sub-base 10 includes an upper face portion to which the card reader 9 is fixed and a bottom face portion that is fixed to the main body base 7. A control board 16 for controlling the card reader 9 is attached between the upper face portion and the bottom face portion of the sub-base 10. The control board 16 is connected to a main control board (not shown) in the card issuing unit 1 through a connector (not shown) and, as a result the card reader part 3 performs giving and receiving signals to and from the main control board to execute one unified function as a card reader in the card issuing unit 1.

The card reject part 6 includes a reject box 17 where disused cards 2 are stored and a sub-base 18 on which the reject box 17 is placed.

The reject box 17 is formed in a rectangular box-like shape whose upper face is opened. A disused card 2 is ejected to the reject box 17. For example, an old card which became unnecessary when a new card is issued is ejected from the card feeding part 5 to be stored in the reject box 17.

The sub-base 18 is, similarly to the sub-base 10, formed of a metal plate such as a sheet steel. The reject box 17 is fixed to the upper face of the sub-base 18 and the under face of the sub-base 18 is fixed to the main body base 7.

FIG. 2(A) is a perspective view showing a cassette 19 in FIG. 1 which is in a closed state and FIG. 2(B) is a perspective view showing the cassette 19 which is in an opened state. FIG. 3 is a perspective view showing a cassette holder 20 which is viewed from the back side in FIG. 1. FIG. 4 is an explanatory side view showing a feeding mechanism 31 in a cassette holder 20 shown in FIG. 3. FIG. 5 is an explanatory front view showing the feeding mechanism 31 in the cassette holder 20 shown in FIG. 3. FIG. 6(A) is a rear view showing a feeding pawl 45 shown in FIG. 4 and FIG. 6(B) is its side view. FIG. 7 is a plan view showing a placing part 32 shown in FIG. 3.

The card stack part 4 includes, as shown in FIG. 1, a cassette 19 in which a number of cards 2 to be issued is stored and a cassette holder 20 in which the cassette 19 is accommodated. As described above, the card issuing unit 1 in accordance with the first embodiment is provided with three card stack parts 4. As shown in FIG. 1, three card stack parts 4 are disposed with an equal space so as to be adjacent to each other in the "Y" direction. Three card stack parts 4 are structured so as to be capable of being individually fixed to the main body base 7 as a module. In other words, three cassette holders 20 are capable of being individually fixed to the main body base 7. Further, a control board 43 described below is connected to a main control board (not shown) of the card issuing unit 1 through a connector (not shown) and, as a result, the card stack part 4 is capable of performing giving and receiving signals to and from the main control board to execute one unified function in the card issuing unit 1.

As shown in FIGS. 2(A) and 2(B), the cassette 19 is formed in a hollow and roughly rectangular box-like shape in a longitudinally long manner. More specifically, the cassette 19 is formed such that the cross-sectional shape of the portion of the cassette 19 where the cards 2 are stacked and which is parallel to the "XY" plane is in a rectangular shape so as to correspond to the shape of the card 2. As shown in FIG. 2(B), the cassette 19 is structured such that a rear face plate 22, an upper face plate 23 and one of side face plates 24 (side face plate on the back side in FIG. 2(A)) are integrally swung with a support shaft 21 as a swing center, which is disposed on the front side (on the "X2" direction side) and on the upper face side. In other words, the cassette 19 is structured such that the rear face plate 22, the upper face plate 23 and the side face plate 24 are integrally swung from a closed state shown in FIG. 2(A) to be in an opened state shown in FIG. 2(B) with the support shaft 21 as a swing center.

In the state shown in FIG. 2(B), a plurality of cards 2 to be issued are stacked and stored in the inside of the cassette 19. In the state shown in FIG. 2(A), the rear face of the cassette 19 may be fixed with a key or the like and, when the rear face of the cassette 19 is fixed with the key or the like, the cassette 19 does not open easily.

In the cassette 19, a card 2 is fed out (ejected) to the card feeding part 5 from an aperture part 25 which is formed on the front side and on the lower end side. Further, as shown in FIG. 2(B), a rectangular opening part 26a which is elongated in the "X" direction is formed in the bottom face 26 of the cassette 19 so as to be penetrated in the "Z" direction. A feeding pawl 45 described below which is provided in the cassette holder 20 enters into the opening part 26a to feed a card 2 stored in the cassette 19 to the card feeding part 5.

As shown in FIGS. 3 through 5, the cassette holder 20 includes two side face plates 27, a front face plate 28 connecting the side face plates 27 on the "X2" direction side (front face side), and a rear face plate 29 connecting the side face plates 27 on the "X1" direction side (rear face side). The cassette holder 20 is formed in a hollow longitudinally long and roughly rectangular box shape. The cassette holder 20 is also provided with the feeding mechanism 31 for feeding (ejecting) a card 2 stored in the cassette 19 to the card feeding part 5, a placing part 32 on which the cassette 19 is placed, and a detecting mechanism 33 for detecting the position of a carriage 60 described below which is included in the card feeding part 5. In accordance with an embodiment, as shown in FIG. 3 and the like, the front plate 28 may connect the side face plates 27 of one cassette holder 20 or, as shown in FIG. 1, the front face plates 28 of three cassette holders 20 are formed in an integral manner and the respective side face plates 27 of three cassette holders 20 may be connected with one piece of integrated front face plate 28.

Attaching parts 27a to the main body base 7 are respectively formed at two positions on the lower end side of the two side face plates 27. Further, as shown in FIG. 3, the front face plate 28 is attached to an upper half portion in a height direction of the side face plates 27 and a lower portion to the front face plate 28 is opened. A card 2 is fed out from the opening portion on the lower side of the front face plate 28 to the "X2" direction.

As shown in FIGS. 5 and 7, the placing part 32 is provided with a first placing member 34 which is formed in a roughly "L" shape that is viewed from the "X" direction and formed in an elongated manner in the "X" direction and a second placing member 35 which is formed in a roughly "L" shape that is viewed from the "X" direction and formed in an elongated manner in the "X" direction. The first placing member 34 and the second placing member 35 are, as shown in FIG. 7, unified each other with three cylindrical mounting members 36 which are fixed to the side face of the second placing member 35 and with three screws 37 which are threadedly engaged with the mounting members 36. As shown in FIG. 5, the first placing member 34 and the second placing member 35 which are unified together are fixed to the side face plates 27 with a cylindrical mounting member 38 that is fixed to the side face of the first placing member 34 and a screw 39 that is threadedly engaged with the mounting member 38, and with a cylindrical mounting member 40 that is fixed to the side face of the second placing member 35 and a screw 41 that is threadedly engaged with the mounting member 40.

As shown in FIG. 7, recessed parts 35b which are recessed in the "Y2" direction are formed at two positions in the upper face 35a of the second placing member 35. More specifically, the recessed parts 35b are formed at two positions, i.e., at a roughly center portion in the "X" direction in the upper face 35a of the second placing member 35 and at its end portion in the "X1" direction. The feeding pawl 45 described below passes through the recessed parts 35b in the "Z" direction. Further, in the second placing member 35, as shown in FIG. 5, a fixing part 35c, to which a control board 43 for driving a drive motor 50 described below included in the feeding mechanism 31 is fixed, is formed so as to be substantially parallel to the upper face 35a.

As shown in FIG. 7, a gap space 44 having a predetermined width in the "Y" direction is formed between the upper face 34a of the first placing member 34 and the upper face 35a of the second placing member 35 and between two recessed parts 35b. More specifically, the gap space 44 having a substantially constant width in the "Y" direction is formed in the "X" direction in an elongated manner. The fixing part 45c of the feeding pawl 45 described below passes through the gap space 44. In accordance with an embodiment, three cylindrical mounting members 36 which are fixed to the second placing member 35 are disposed at positions where the feeding pawl 45 can be moved without being obstructed by the mounting members 36.

The upper face 34a of the first placing member 34 and the upper face 35a of the second placing member 35 are formed in parallel with the "XY" plane so as to form one plane as a placing face for the cassette 19. In other words, a space formed on the upper side of the upper faces 34a and 35a are formed in an accommodating part for the cassette 19. The upper faces 34a and 35a are disposed on the lower side from the bottom end of the front face plate 28 in the "Z" direction. Further, when the cassette 19 is placed on the upper faces 34a and 35a, the gap space 44 corresponds to the opening part 26a formed in the bottom face 26 of the cassette 19 in the "Z" direction.

As shown in FIG. 4 and the like, the feeding mechanism 31 includes a feeding pawl 45 for feeding a card 2 stored in the cassette 19 to the card feeding part 5, a chain 46 to which the feeding pawl 45 is fixed, two sprockets 47 to which the chain 46 is hung over so as to be engaged with the sprockets 47, two rotary shafts 48 to which the sprockets 47 are respectively fixed, a pulley 49 which is fixed to a shaft end of one of two rotary shafts 48, a drive motor 50 such as a stepping motor, a pulley 51 which is fixed to the tip end side of an output shaft of the drive motor 50, and a belt 52 which is hung over the pulleys 49, 51. The feeding mechanism 31 corresponds to a card ejection mechanism for ejecting a card 2 to the card feeding part 5. In FIG. 5, the feeding pawl 45 and the chain 46 are not shown.

As shown in FIG. 5, the drive motor 50 is fixed to the inner side of one ("Y1" direction side) of the side face plates 27 at a bottom end portion of the cassette holder 20. The output shaft of the drive motor 50 is protruded on the outer side ("Y1" direction side) of the side face plate 27 to which the drive motor 50 is fixed.

As shown in FIG. 5, two rotary shafts 48 are respectively rotatably held to the first placing member 34 and the second placing member 35 with bearings 54 (only one bearing 54 is shown in FIG. 5) which are fixed to the side face of the first placing member 34 and with bearings 55 (only one bearing 55 is shown in FIG. 5) which are fixed to the side face of the second placing member 35. More specifically, two rotary shafts 48 are disposed at approximately the same height with a predetermined distance in the "X" direction. The shaft end of the rotary shaft 48 which is disposed on the "X2" direction side is protruded on the outer side ("Y1" direction side) of the side face plate 27 to which the drive motor 50 is fixed. The pulley 49 is fixed to the protruded portion.

As shown in FIG. 5, the sprockets 47 are respectively disposed between the side face of the first placing member 34 and the side face of the second placing member 35 under the state that the sprockets 47 are fixed to the rotary shafts 48.

As shown in FIG. 6, the feeding pawl 45 is provided with a card feeding part 45b in which an abutting part 45a is formed for abutting with an end of a card 2 in the "X1" direction stored in the inside of the cassette 19 and a fixing part 45c that is fixed to the chain 46. The feeding pawl 45 is formed in a roughly "L" shape when viewed from the "X" direction. In other words, in the feeding pawl 45, the width of the card feeding part 45b that is disposed on the upper side is set to be wider than that of the fixing part 45c that is disposed on the lower side.

The card feeding part 45b is capable of passing through the recessed parts 35b in the "Z" direction which are formed in the upper face 35a of the second placing member 35. Further, the card feeding part 45b is capable of passing through the opening part 26a that is formed in the bottom face 26 of the cassette 19 in the "Z" direction and is capable of moving within the opening part 26a to the "X2" direction. In other words, the width in the "Y" direction of the card feeding part 45b is set to be smaller than the width of the recessed parts 35b and the width in the "Y" direction of the opening part 26a. The fixing part 45c is capable of moving to the "X2" direction within the gap space 44 that is formed between the upper face 34a of the first placing member 34 and the upper face 35a of the second placing member 35. In other words, the width in the "Y" direction of the fixing part 45c is set to be smaller than that in the "Y" direction of the gap space 44.

As described above, the feeding pawl 45, which is fixed to the chain 46, passes through one of the recessed parts 35b formed at the end in the "X1" direction to the upper side according to the rotation of the sprockets 47 to be located above the upper face 34a of the first placing member 34 and the upper face 35a of the second placing member 35, and then the feeding pawl 45 moves in the "X2" direction under the state that the card feeding part 45b is protruded on the upper side of the upper faces 34a and 35a. After that, the feeding pawl 45 passes through the other of the recessed parts 35b downward and located and hidden on the under side of the upper faces 34a, 35a. When the card feeding part 45b moves in the "X2" direction under the state that the card feeding part 45b is protruded on the upper side of the upper faces 34a and 35a, the abutting part 45a abuts with the end in the "X1" direction of a card 2 that is stored at the bottom of the cassette 19 to feed the card 2 in the "X2" direction.

As shown in FIG. 3, the detecting mechanism 33 includes a photo sensor 56 having a light emitting element and a light receiving element (not shown) and a board 57 to which the photo sensor 56 is fixed. The board 57 is connected to the control board 43 through a connector not shown. The detecting mechanism 33 is fixed to one ("Y1" direction side) of the side face plates 27 on the front side ("X2" direction side) of the cassette holder 20.

FIG. 8 is a perspective view showing a card feeding part 5 which is viewed from near side in FIG. 1. FIG. 9 is a perspective view showing the card feeding part 5 which is viewed from the back side in FIG. 1. FIG. 10 is an explanatory front view showing the card feeding mechanism 62 in the card feeding part 5 shown in FIG. 8. FIG. 11 is an explanatory front view showing a draw-in mechanism 61 of the card feeding part 5 shown in FIG. 8. FIG. 12 is an explanatory side view showing the draw-in mechanism 61 of the card feeding part 5 shown in FIG. 8.

As shown in FIG. 8 and the like, the card feeding part 5 includes two side plates 59 which are formed in parallel to the "ZX" plane and are disposed with a predetermined distance in the "Y" direction and a carriage 60 which moves in the "Y" direction between two side plates 59. As shown in FIGS. 10 through 12, the card feeding part 5 includes a draw-in mechanism 61 for drawing a card 2 that is ejected from the card reader part 3 or a card 2 that is fed (ejected) from the card stock part 4 into the inside of the carriage 60 and a card feeding mechanism 62 for carrying the card 2 drawn into the inside of the carriage 60 in the "Y" direction along with the carriage 60. The card feeding part 5 is provided with a control board (not shown) for driving and controlling the draw-in mechanism 61 and the card feeding mechanism 62. The control board is connected to the main control board (not shown) of the card issuing unit 1 through a connector (not shown). As a result, the card feeding part 5 is structured so as to perform giving and receiving signals to and from the main control board to execute one unified function in the card issuing unit 1. The draw-in mechanism 61 also serves as a feeding mechanism for feeding a card 2 to the card reader part 3 or the card reject part 6.

As shown in FIG. 8 and the like, the side plates 59 are formed in a roughly "L" shape when viewed in the "X" direction. The lower end portions of the side plates 59 are formed to be a fixing part which is fixed to the main body base 7.

As shown in FIGS. 9 and 10, the card feeding mechanism 62 includes two long cylindrical guide shafts 63, one end of which is fixed to one of the side plates 59 and the other end is fixed to the other of the side plates 59, two pulleys 65 mounted on a connector plate 64 which connects two side plates 59, a drive motor 66 such as a stepping motor, a pulley 67 fixed to the output shaft of the drive motor 66, a belt 68 which is hung over two pulleys 65 and the pulley 67, and a tension roller 69 for adjusting the tension of the belt 68. In FIG. 10, the connector plate 64 is not shown.

Both ends of one of two guide shafts 63 are fixed to upper end portions of the side plates 59 and on end portions in the "X1" direction, and both ends of the other of the guide shafts 63 are fixed to upper end portions of the side plates 59 and on end portions in the "X2" direction. The guide shafts 63 are respectively passed through two sliding members 71 mounted on side plates 70 described below which are included in the carriage 60. In other words, the guide shafts 63 are respectively passed through two sliding members 71, i.e., the sliding members 71 mounted on one of the side plates 70 and the sliding members 71 mounted on the other of the side plates 70. The carriage 60 can be smoothly moved along the guide shafts 63 in the "Y" direction by the sliding members 71.

The connector plate 64 connects the end portions of the side plates 59, 59 in the X1 direction and on a lower side. One of two pulleys 65 is rotatably mounted on an end portion in the "Y1" direction and on the upper end side of the connector plate 64 and the other of the pulleys 65 is rotatably mounted on an end portion in the "Y2" direction and on the upper end side of the connector plate 64. The drive motor 66 is fixed to an end portion in the "Y2" direction of the connector plate 64 and on the lower side of the other of the pulleys 65. The drive motor 66 is fixed to the connector plate 64 such that the output shaft of the drive motor 66 is protruded in the "X1" direction from the connector plate 64.

One portion of the belt 68 is fixed to the carriage 60. Therefore, when the drive motor 66 is rotationally driven, the carriage 60 moves in the "Y" direction along with the belt 68.

The carriage 60 includes two side plates 70 which are formed in parallel to the "ZX" plane. Two side plates 70 are fixed each other with a predetermined distance in the "Y" direction by using fixing members not shown to structure a frame of the carriage 60.

The draw-in mechanism 61 includes two drive rollers 72 for drawing a card 2 ejected from the card reader part 3 or the like into the inside of the carriage 60 and for feeding out the card 2 in the inside of the carriage 60 to the card reader part 3 or the like and driven rollers 73 which are respectively disposed on the upper side of the drive rollers 72 so as to face the drive rollers 72. The draw-in mechanism 61 also includes pulleys 74 which are integrally formed with the drive rollers 72, a belt 75 which transmits power to the pulleys 74, a pulley 76 around which the belt 75 is stretched along with the pulleys 74, an elongated rotor shaft 77 which is rotated along with the pulley 76, a pulley 78 which is fixed to one end of the rotor shaft 77, a drive motor 79 such as a stepping motor, a pulley 80 which is fixed to the output shaft of the drive motor 79, and a belt 81 which is stretched between the pulley 78 and the pulley 80. As shown in FIG. 12, the draw-in mechanism 61 is provided with a tension roller 82 for adjusting the tension of the belt 75.

As shown in FIG. 11 and the like, the drive motor 79 is fixed to a lower end portion of the side plate 59 which is disposed on the "Y1" direction side. The output shaft of the drive motor 79 is protruded to the outer side ("Y1" direction side) of the side plate 59 to which the drive motor 79 is fixed.

The rotor shaft 77 is rotatably supported on the upper side of the drive motor 79 with two side plates 59. More specifically, both ends of the rotor shaft 77 are supported by bearings 83 which are respectively fixed to the side plates 59 and thus the rotor shaft 77 is rotatably held to the side plates 59. Further, as shown in FIG. 11 and the like, the portions of the rotor shaft 77 which are supported by the bearings 83 are formed in a cylindrical shape and a portion therebetween is formed in a hexagonal shape. According to the structure described above, power which is transmitted to the rotor shaft 77 from the drive motor 79 through the pulleys 78 and 80 and the belt 81 is transmitted to the pulley 76. The pulley 78 is fixed to the end portion in the "Y1" direction of the rotor shaft 77.

The pulley 76 is formed in a roughly cylindrical shape and the rotor shaft 77 is passed through its inner circumferential side. In accordance with the first embodiment, the inner circumferential face of the pulley 76 is formed in a slightly larger hexagonal shape than the outer form of the rotor shaft 77 when viewed in the "Y" direction. Therefore, when the rotor shaft 77 rotates, the pulley 76 is also rotated. The pulley 76 is included in the carriage 60 and the inner circumferential face of the pulley 76 is capable of sliding on the rotor shaft 77. In other words, the pulley 76 smoothly moves in the "Y" direction along the rotor shaft 77.

The drive rollers 72 and the pulleys 74 integrally formed with the drive rollers 72 are mounted on the carriage 60. More specifically, as shown in FIGS. 8, 11 and the like, the drive rollers 72 and the pulleys 74 are rotatably held to fixed shafts 84 whose both ends are fixed to two side plates 70. In other words, the drive rollers 72 and the pulleys 74 are respectively provided with a bearing.

The driven rollers 73 are also mounted on the carriage 60. More specifically, as shown in FIGS. 8 and 9, both ends of fixed shafts 85 are fixed to two side plates 70. Base end portions of lever members 86, which respectively hold the driven rollers 73 rotatably on its tip end side, are swingably held to the fixed shafts 85. The lever members 86 are respectively urged by an urging member (not shown) such that the driven rollers 73 held on the tip end sides of the lever members 86 are subjected to urging forces toward the drive rollers 72 which face the respective driven rollers 73.

As shown in FIG. 12, two drive rollers 72 and two driven rollers 73 are disposed with a distance (distance in the "X" direction) in which both ends of a card 2 taken into the carriage 60 can be held with two pairs of the drive roller 72 and the driven roller 73.

As described above, in the draw-in mechanism 61, when the drive motor 79 rotates, the drive rollers 72 are rotated. A card 2 ejected from the card reader part 3 or the like are drawn into the inside of the carriage 60 by the drive rollers 72 and the driven rollers 73 which are urged toward the drive rollers 72. The card 2 in the inside of the carriage 60 is fed out to the card reader part 3 or the like by the drive rollers 72 and the driven rollers 73.

As shown in FIGS. 8 and 9, the carriage 60 is provided with two guide parts 87 for adequately guiding the end in the "X" direction of the card 2 to the inside of the carriage 60 and a detection plate 88 for detecting the position of the carriage 60 by the detecting mechanism 33. The side plates 70 are formed with guide parts 70a for adequately guiding both side faces in the "Y" direction of the card 2 to the inside of the carriage 60.

In the guide parts 87, two flat shaped guide plates are fixed to the side plates 70 such that the guide plates are disposed with a predetermined distance in a height direction so as to correspond to the thickness of the card 2. Further, both end portions in the "X" direction of the guide parts 87 are formed such that a distance between two guide plates is set to be gradually widened toward the outer side in the "X" direction so as to adequately guide the card 2 into the inside of the carriage 60 (see FIGS. 8 and 9).

The guide parts 70a are formed at both end portions in the "X" direction of two side plates 70. In other words, as shown in FIGS. 8 and 9, in accordance with the first embodiment, four guide parts 70a are formed in the carriage 60. The guide parts 70a are respectively formed so as to open on the outer side in the "Y" direction from the both ends in the "X" direction of the side plates 70.

The detection plate 88 is formed in a flat plate shape. As shown in FIG. 9, the detection plate 88 is fixed to the carriage 60 on the end side in the "X1" direction and on the lower end side so as to be in parallel to the "XY" plane. The detection plate 88 is protruded in the "X1" direction from the carriage 60.

An example of a schematic operation of the card issuing unit 1 which is structured as described above will be described below. A schematic operation described below is an example of a schematic operation of the card issuing unit 1 but the operation of the card issuing unit 1 is not limited to this embodiment.

First an issuing operation of a card 2 in the card issuing unit 1 in which, for example, three different types of cards 2 are stored in three cassettes 19, will be described below.

When a card issue command for issuing a specified card 2 is given from a host device such as a financial terminal equipment on which the card issuing unit 1 is mounted, the carriage 60 is moved to the position of the cassette 19 in which the specified card 2 is stored. More specifically, the drive motor 66 is rotated to move the carriage 60. When the detection plate 88 provided in the carriage 60 is detected by the detecting mechanism 33 which is fixed to the front portion of the cassette holder 20 where the carriage 60 is to be stopped, the carriage 60 is stopped.

When the carriage 60 is stopped, the feeding mechanism 31 carries a card 2, which is stored at the bottom position in the cassette 19, to the carriage 60. More specifically, with the rotation of the drive motor 50, the abutting part 45a of the feeding pawl 45 abuts with the end in the "X1" direction of the card 2 stored at the bottom of the cassette 19 to feed the card 2 in the "X2" direction.

When the card 2 is carried out, the draw-in mechanism 61 of the carriage 60 draws the card 2 into the inside of the carriage 60. More specifically, the drive rollers 72 which are rotated by the drive motor 79 and the driven rollers 73 draw the card 2 into the inside of the carriage 60.

When the card 2 is drawn into the inside of the carriage 60, if necessary, the carriage 60 is moved to the position for the card reader 9. When the carriage 60 is moved to the card reader 9, the draw-in mechanism 61 of the carriage 60 carries out the card 2 to the card reader 9. More specifically, the drive rollers 72 which are rotated by the drive motor 79 and the driven rollers 73 carries out the card 2 from the inside of the carriage 60 to the rear side insert slot 12 of the card reader 9.

When the card 2 is carried out from the inside of the carriage 60 to the rear side insert slot 12 of the card reader 9, the feeding mechanism of the card reader 9 carries the card 2 to the front side insert slot 11. Specified information is recorded in the card 2 during the card is carried to the front side insert slot 11 from the rear side insert slot 12. The card 2 in which the specified information is recorded is issued (ejected) from the front side insert slot 11.

Next, reject operation of a disused card 2 will be described below.

When a card 2 is inserted from the front side insert slot 11 of the card reader 9, specified information recorded in the card 2 is reproduced during the feeding mechanism of the card reader 9 carries the card 2 to the rear side insert slot 12. When it is judged that the inserted card 2 is a disused card, the feeding mechanism of the card reader 9 ejects the card 2 from the rear side slot 12 to the carriage 60 which is on standby at a predetermined position in advance.

When the card 2 is ejected from the card reader 9, the draw-in mechanism 61 of the carriage 60 draws the card 2 into the inside of the carriage 60. When the card 2 is drawn into the carriage 60, the carriage 60 is moved to the position of the reject box 17. After that, the draw-in mechanism 61 of the carriage 60 carries out the card 2 to the reject box 17. When required, a new card 2 is issued on the basis of the above-mentioned operation.

As described above, in the card issuing unit 1 in accordance with the first embodiment, the card reader part 3, the card stack parts 4, the card feeding part 5 and the card reject part 6 are mounted on the main body base 7 as modules. In other words, these parts are placed on the main body base 7, each of which is structured as a functionally unified portion. Therefore, the card stack parts 4 are structured so as to be capable of being separated from the card feeding part 5. Accordingly, the card stack parts 4 can be freely disposed to the card feeding part 5. Further, the arrangement of the card reader part 3, the card stack parts 4, the card feeding part 5 and the card reject part 6 can be easily modified on the main body base 7. Therefore, in the card issuing unit 1 in accordance with the first embodiment a layout of the respective parts can be easily modified.

In accordance with the first embodiment, the cassette holder 20 is provided with the feeding mechanism 31 for ejecting a card 2 to the card feeding part 5. Therefore, the card feeding part 5 is not required to have a receiving mechanism which enters into the inside of the cassette holder 20 to take a card 2. Accordingly, it is not required to maintain a high degree of relative positional accuracy between the card stack part 4 and the card feeding part 5. As a result, modularization of the card stack part 4 can be easily attained. Further, the structure of the card feeding part 5 is simplified and thus modularization of the card feeding part 5 can be easily attained. Therefore, the layout of the card issuing unit 1 is easily modified.

In accordance with the first embodiment, the ejecting direction of a card 2 from the cassette holder 20 and the carrying direction of the card 2 in the card feeding part 5 (moving direction of the carriage 60) are perpendicular to each other. Therefore, more card stack parts 4 may be disposed in a state that they are adjacent to the card feeding part 5 in the "X" direction. Accordingly, when a plurality of cassettes 19 is disposed, a number of cards 2 or many types of cards 2 can be stored.

In accordance with the first embodiment, the card stack parts 4 are disposed to be adjacent to the card feeding part 5 on the "X1" direction side and the card reader part 3 is disposed to be adjacent to the card feeding part 5 on the "X2" direction side. Therefore, the size of the card issuing unit 1 in the "Y" direction can be reduced.

In accordance with the first embodiment the card feeding part 5 is provided with the draw-in mechanism 61 for drawing a card 2 which is carried out from the cassette holder 20 into the inside of the carriage 60. Therefore, the card 2 can be surely drawn into the inside of the carriage 60. As a result interference between a card 2 when the card is carried and the card stack parts 4 can be surely prevented.

In accordance with the first embodiment, the cassette holder 20 is provided with the detecting mechanism 33 for detecting the position of the carriage 60. Therefore, even when the arrangement of the modularized card stack parts 4 is modified in various ways, alignment of the carriage 60, on which the draw-in mechanism 61 is mounted, with the cassette holders 20 can be surely performed. Accordingly, the card 2 can be surely carried from the card stack part 4 to the card feeding part 5.

The card issuing unit 1 in accordance with the first embodiment described above is provided with three card stack parts 4. However, the number of the card stack parts 4 is not limited to three and, for example, as shown in a card issuing unit 101 in FIG. 13, five card stack parts 4 may be provided. Further, the number of the card stack parts 4 in the card issuing unit may be one, two, four, six or more.

Second Embodiment

FIG. 14 is a plan view showing a card issuing unit in accordance with a second embodiment of the present invention. FIG. 15 is a side view showing the card issuing unit 201 shown in FIG. 14.

The card issuing unit 201 in accordance with the second embodiment differs from the card issuing unit 1 in the first embodiment in the points that an extended feeding part 206 is provided and the card reject part 6 is not provided. Further, the shape of the main body base 207, on which the card reader part 3 and the card stock parts and the like are placed, and the arrangement of the respective parts on the main body base 207 differs from those in the card issuing unit 1 in the first embodiment. The structure of the card issuing unit 201 in accordance with the second embodiment will be described below mainly about the structures that differ from the card issuing unit 1 in the first embodiment. The structures in the card issuing unit 201 other than the above-mentioned structures are common to the card issuing unit 1 in the first embodiment and thus the same notational symbols are used in the common structures and their description is omitted or simplified. Alternatively, the illustration and description of the common structure to the card issuing unit 1 may be omitted.

As shown in FIG. 14, the card issuing unit 201 in accordance with the second embodiment includes a card reader part 3, card stack parts 4, a card feeding part 5 and an extended feeding part 206. These parts are respectively placed on a main body base 207 as a module.

As shown in FIG. 14, the main body base 207 is formed in a roughly "L" shape. More specifically, the main body base 207 is formed in a roughly "L" shape in which the width in the "Y" direction of a portion on the "X2" direction side is smaller than the width in the "Y" direction of a portion on the "X1" direction side. According to the structure described above, a host device such as a financial terminal equipment to which the card issuing unit 201 is attached is capable of being disposed on a portion on the "X2" direction side of the main body base 207 whose width in the "Y" direction is small so as to be adjacent in the "Y1" direction.

As shown in FIG. 14, the card reader part 3 is mounted on the "X2" direction end side of the main body base 207. The extended feeding part 206 is mounted on the main body base 207 on the "X1" direction side of the card reader part 3 so as to be adjacent to the card reader part 3. The card feeding part 5 is mounted on the main body base 207 on the "X1" direction side of the extended feeding part 206 so as to be adjacent to the extended feeding part 206. Three card stack parts 4 are mounted on the main body base 207 on the "X1 direction side of the card feeding part 5 so as to be adjacent to the card feeding part 5.

The extended feeding part 206 carries a card 2 ejected from the rear side insert slot 12 of the card reader 9 in the "X1" direction to the card feeding part 5 and carries a card 2 carried out from the card feeding part 5 in the "X2" direction to the rear side insert slot 12 of the card reader 9. More specifically, as shown in FIG. 14, the extended feeding part 206 is provided with four feeding rollers 210 for carrying a card 2. The feeding rollers 210 are rotationally driven by a drive motor 211 (see FIG. 15), pulleys 212, belts 213 and the like. The extended feeding part 206 is provided with a control board (not shown) for driving and controlling the drive motor 211. The control board is connected to a main control board (not shown) of the card issuing unit 201 through a connector (not shown) and, as a result, the extended feeding part 206 is capable of performing giving and receiving signals to and from the main control board to execute one unified function in the card issuing unit 201. In accordance with the second embodiment, the extended feeding part 206 is a card processing part for performing prescribed processing to a card 2.

In the card issuing unit 201 structured as described above, similar effects to those of the card issuing unit 1 in accordance with the first embodiment 1 can be obtained.

Third Embodiment

FIG. 16 is a perspective view showing a card issuing unit 301 in accordance with a third embodiment of the present invention. FIG. 17 is a plan view showing the card issuing unit 301 shown in FIG. 16. FIG. 18 is a side view showing the card issuing unit 301 which is viewed from the "E-E" direction in FIG. 17. FIG. 19(A) is a view showing a card turning part 305 shown in FIG. 17 in a state that a mounting member 313 is inclined in one direction and FIG. 19(B) is a view in a state that the mounting member 313 is inclined in the other direction.

The card issuing unit 301 in accordance with the third embodiment differs from the card issuing unit 1 in accordance with the first embodiment in the points that five card stack parts 4 are provided, that a card turning part 305 is provided, and that a card reject part 306 is disposed on the under side of the main body base 307. The structure of the card issuing unit 301 in accordance with the third embodiment will be described below mainly about the structures that differ from the card issuing unit 1 in the first embodiment. The structures in the card issuing unit 301 other than the above-mentioned structures are common to the card issuing unit 1 in the first embodiment and thus the same notational symbols are used in the common structures and their description is omitted or simplified. Alternatively, the illustration and description of the common structure to the card issuing unit 1 may be omitted.

As shown in FIGS. 16 through 18, the card issuing unit 301 in accordance with the third embodiment includes a card reader part 3, five card stack parts 4, a card feeding part 5 and a card turning part 305 by which a card 2 is capable of being swung in a specified direction. These parts are respectively mounted on the main body base 307 as a module. Also, the card issuing unit 301 is provided with a card reject part 306.

As shown in FIG. 17, the card reader part 3 is mounted on the center position in the "Y" direction on the "X2" direction end side of the main body base 307. The card feeding part 5 is mounted on the main body base 307 on the "X1" direction side of the card reader part 3 so as to be adjacent to the card reader part 3. Three card stack parts 4 are mounted on the main body base 307 on the "X1" direction side of the card feeding part 5 so as to be adjacent to the card feeding part 5. Another card stack part 4 is mounted on the main body base 307 on the "Y2" direction side of the card reader part 3 and on the "X2" direction side of the card feeding part 5. The card turning part 305 is mounted on the main body base 307 on the "Y1" direction side of the card reader part 3 and on the "X2" direction side of the card feeding part 5. Another card stack part 4 is mounted on the main body base 307 on the "Y1" direction side of the card reader part 3 and on the "X2" direction side of the card turning part 305.

A through-hole (not shown) penetrating the main body base 307 in an up-and-down direction is formed in the main body base 307 at a portion where the card turning part 305 is mounted. As shown in FIG. 18, the card reject part 306 is disposed on the under side of the through-hole.

As shown in FIG. 19, the card turning part 305 includes two drive rollers 311 for feeding a card 2 and two driven rollers 312 which respectively face the drive rollers 311. The drive rollers 311 and the driven rollers 312 are rotatably attached to the mounting member 313. The mounting member 313 is attached at a roughly center position of a frame 314 of the card turning part 305 and swings with a fixing shaft 315 whose axial direction is the "Y" direction as its swing center. The lower end side of the frame 314 is opened so as to communicate with the through-hole formed in the main body base 307.

The card turning part 305 is provided with a feed drive means for driving the drive rollers 311 and a swing drive means for swinging the mounting member 313. The card turning part 305 is provided with a control board (not shown) for driving and controlling the feed drive means and the swing drive means. The control board is connected to a main control board (not shown) of the card issuing unit 301 through a connector (not shown) and, as a result, the card turning part 305 is capable of performing giving and receiving signals to and from the main control board to execute one unified function in the card issuing unit 301. In accordance with the third embodiment, the card turning part 305 is also a card processing part for performing prescribed processing to a card 2.

The feed drive means for driving the drive rollers 311 includes a drive motor 316 fixed to the upper part of the frame 314, a pulley 317 fixed to the output shaft of the drive motor 316, a pulley 318 which rotates with a fixed shaft 315 as a rotating center, and a belt 319 that is hung over between the pulley 317 and the pulley 318. The feed drive means includes a pulley (not shown) which is integrally formed with the pulley 318, pulleys (not shown) which are integrally formed with the drive rollers 311, and a belt which is hung over between these pulleys. When the drive motor 316 is driven, the drive rollers 311 are rotated.

Two driven rollers 312 are urged toward the drive rollers 311 that respective driven rollers 312 face by a biasing means not shown in the drawings. The driven rollers 312 carry a card 2 in the "X" direction along with the drive rollers 311.

Two drive rollers 311 and two driven rollers 312 are disposed with a distance (distance in the "X" direction) that both ends of a card 2 taken into the inside of the card turning part 305 are capable of being held by two pairs of the drive rollers 311 and the driven rollers 312.

The swing drive means which swings the mounting member 313 includes a drive motor 320 fixed at the upper part of the frame 314, a pulley 321 fixed to an output shaft of the drive motor 320, a pulley 322 which swings with the fixed shaft 315 as a swing center, and a belt 323 that is hung over between the pulley 321 and the pulley 322.

The mounting member 313 and the pulley 322 are fixed to each other. In other words, the mounting member 313 and the pulley 322 are integrally turned. Therefore, when the drive motor 320 is driven in one direction, the mounting member 313 is turned, as shown in FIG. 19(A), so as to incline in the "X2" direction about the fixed shaft 315 and, when the drive motor 320 is driven in the other direction, the mounting member 313 is turned, as shown in FIG. 19(B), so as to incline in the "X1" direction about the fixed shaft 315.

The card reject part 306 includes two reject boxes 330 which are disposed so as to be adjacent in the "X" direction. Each of upper faces of the reject boxes 330 are opened such that a card 2 passed through the through-hole of the main body base 307 is stored.

As shown in FIG. 18, the mounting member 313 is normally set to be in a horizontal state. A card 2 which is carried out from the card stack part 4 disposed so as to be adjacent to the card turning part 305 in the "X2" direction is carried by the drive rollers 311 and the driven rollers 312 to eject to the card feeding part 5.

When a disused card 2 is taken into the card reader 9, the card 2 is taken into the card turning part 305 through the card feeding part 5. More specifically, under the condition that the mounting member 313 is in a horizontal state, the card 2 carried out by the draw-in mechanism 61 of the carriage 60 is taken into the inside of the card turning part 305 by the drive rollers 311 and the driven rollers 312.

As shown in FIGS. 19(A) and 19(B), when a disused card 2 is taken into the inside of the card turning part 305, the mounting member 313 is swung and inclined to eject the card 2 to the card reject part 306. More specifically, as shown in FIG. 19(A), when the mounting member 313 is inclined in the "X2" direction, the card 2 is ejected to the reject box 330 on the "X2" direction side and, when the mounting member 313 is inclined in the "X1" direction as shown in FIG. 19(B), the card 2 is ejected to the reject box 330 on the "X1" direction side.

Also in the card issuing unit 301 structured as described above, similar effects to those of the card issuing unit 1 in accordance with the first embodiment 1 can be obtained.

Other Embodiments

The present invention has been described in detail using the embodiments, but the present invention is not limited to the embodiments described above and many modifications can be made without departing from the present invention.

In the embodiments described above, the card reader part 3, the card stack parts 4, the card feeding part 5, the card reject part 6, the extended feeding part 206 and the card turning part 305 are mounted on the main body base 7, 207 or 307 as modules. However, parts mounted on the main body base 7, 207 or 307 are not limited to these parts. For example, in addition to these parts, a printer which performs a predetermined printing on one side or both sides of a card 2 may be mounted on the main body base 7, 207 or 307 as a module. In this case, the printer is preferably disposed so as to be adjacent to the card feeding part 5. Further, in this case, the front face and the rear face of a card 2 may be preferably reversed by using a structure similar to the card turning part 305. In other words, the front face and the rear face of the card 2 are preferably reversed by using a modularized card reversing part. In this case, the printer and the card reversing part are card processing parts which perform predetermined processing to a card 2.

Further, in order to be capable of performing processing even when a plurality of cards 2 is taken into the card issuing unit 1, 101, 201 or 301, a card holding part which temporarily holds a card 2 may be mounted on the main body base 7, 207 or 307 as a module. In this case, the card holding part may include feeding rollers to take-in or eject a card 2. Further, in this case, it is preferable that the card holding part is disposed so as to be adjacent to the card feeding part 5. In this case, the card holding part is a card processing part for performing a predetermined processing to the card 2.

In the respective embodiments described above, the card stack parts 4 are separately mounted on the main body base 7, 207 or 307. Alternatively, for example, a plurality (for example, three or five) of the card stack parts 4 is unified and the unified card stack part 4 may be mounted on the main body base 7, 207 or 307 as a module.

In addition, in the respective embodiments described above, the card stack part 4 is provided with the card feeding mechanism 31 to eject a card 2 to the card feeding part 5.

Alternatively, for example, a taking-out mechanism for taking out a card 2 from the cassette 19 may be provided in the carriage 60.

In the respective embodiments described above, the card stack parts 4 are mounted on the main body base 7, 207 or 307 so as to be adjacent with roughly equal distances. Alternatively, for example, the card stack parts 4 may be mounted on the main body base 7, 207 or 307 in a separated state with roughly equal distances and may be mounted on the main body base 7, 207 or 307 in a separated state with different distances. In this case, since the cassette holder 20 is provided with the detecting mechanism 33, the alignment of the carriage 60 with the cassette holder 20 can be surely performed.

In the respective embodiments described above, the detecting mechanism 33 is structured by using the photo sensor 56. Alternatively, for example, the detecting mechanism 33 may be structured by using a mechanical contact switch or a magnetic sensor.

In addition, the present invention may be applied to a card processing unit without the structure for issuing a card 2 such as the card issuing unit 1, 101, 201 or 301.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card processing unit for use with at least one or more cards comprising:
   a card processing part for performing a predetermined processing to the at least one or more cards;
   a card stack part in which the at least one or more cards are stacked and stored;
   a card feeding part for carrying the at least one or more cards between the card processing part and the card stack part; and
   a main body base on which at least the card stack part and the card feeding part are mounted;
   wherein the card stack part is mounted on the main body base as a module;
   wherein the card stack part includes a card ejection mechanism for ejecting a card to the card feeding part;
   the card ejection mechanism comprises:
      a feeding mechanism for ejecting a card which is stored in the card feeding part;
      a placing part; and
      a detecting mechanism for detecting a position of the card feeding part;
   the feeding mechanism, the placing part, and the detecting mechanism is provided in the card stack part; and
   the card stack part is provided with a drive motor for driving the feeding mechanism which is mounted on the under side of the placing part.

2. The card processing unit according to claim 1, wherein the card stack part includes a cassette which is structured for storing a number of cards and a cassette holder into which the cassette is accommodated; and
   the cassette holder is mounted on the main body base as a module.

3. The card processing unit according to claim 2, wherein the cassette holder a feeding pawl for carrying a card which is stored in the cassette to the card feeding part, the feeding pawl being moved by the drive motor.

4. The card processing unit according to claim 3, wherein
   the cassette holder is provided with a control board which is connected to a main control board of the card issuing unit through a connector; and
   the card stack part is structured to perform one unified function as the module by means of that the control board gives and receives signals to and from the main control board.

5. The card processing unit of claim 1,
   wherein the card feeding part includes a carriage for feeding a card on which at least a part of a draw-in mechanism is mounted, and the card stack part is provided with a detecting mechanism for detecting a position of the carriage.

6. A card processing unit for use with at least one or more cards comprising:
   a card processing part for performing a predetermined processing to the at least one or more cards;
   a card stack part in which the at least one or more cards are piled and stored; and
   a card feeding part for carrying the at least one or more cards between the card processing part and the card stack part;
   wherein the card stack part is provided with a card ejection mechanism for ejecting a card to the card feeding part;
   the card ejection mechanism comprises:
      a feeding mechanism for ejecting a card which is stored in the card feeding part;
      a placing part; and
      a detecting mechanism for detecting a position of the card feeding part;
   the feeding mechanism, the placing part, and the detecting mechanism is provided in the card stack part; and
   the card stack part is provided with a drive motor for driving the feeding mechanism which is mounted on the under side of the placing part.

7. The card processing unit according to claim 6, wherein an ejecting direction of the card in the card stack part is perpendicular to a carrying direction of the card in the card feeding part.

8. The card processing unit according to claim 6, wherein the card stack part is disposed on one side of the card feeding part in a direction that is perpendicular to a carrying direction of the card in the card feeding part, and the card processing part is disposed on the other side of the card feeding part.

9. The card processing unit according to claim 6, wherein the card feeding part is provided with a draw-in mechanism for drawing the card which is ejected by the card ejection mechanism from the card stack part.

10. The card processing unit according to claim 9, wherein the card feeding part includes a carriage for feeding a card on which at least a part of the draw-in mechanism is mounted, and the card stack part is provided with a detecting mechanism for detecting a position of the carriage.

* * * * *